United States Patent
Si et al.

(10) Patent No.: US 10,911,205 B2
(45) Date of Patent: Feb. 2, 2021

(54) METHOD AND DEVICE FOR FEEDING BACK DOWNLINK DATA

(71) Applicant: CHINA ACADEMY OF TELECOMMUNICATIONS TECHNOLOGY, Beijing (CN)

(72) Inventors: Qianqian Si, Beijing (CN); Xueming Pan, Beijing (CN)

(73) Assignee: CHINA ACADEMY OF TELECOMUNICATIONS TECHNOLOGY, Beijing (CN)

(*) Notice: Subject to any disclaimer, the term of this patent is extended or adjusted under 35 U.S.C. 154(b) by 6 days.

(21) Appl. No.: 16/325,178

(22) PCT Filed: May 27, 2017

(86) PCT No.: PCT/CN2017/086271
§ 371 (c)(1),
(2) Date: Feb. 12, 2019

(87) PCT Pub. No.: WO2018/028278
PCT Pub. Date: Feb. 15, 2018

(65) Prior Publication Data
US 2019/0190680 A1    Jun. 20, 2019

(30) Foreign Application Priority Data
Aug. 12, 2016  (CN) .......................... 2016 1 0665878

(51) Int. Cl.
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1812* (2013.01); *H04L 1/1822* (2013.01);
(Continued)

(58) Field of Classification Search
None
See application file for complete search history.

(56) References Cited

U.S. PATENT DOCUMENTS

| 2013/0121216 | A1* | 5/2013 | Chen ............... H04L 5/0005 370/280 |
| 2016/0205690 | A1  | 7/2016 | Berggren et al. |
| 2017/0063516 | A1* | 3/2017 | Miao ............... H04L 1/1887 |

FOREIGN PATENT DOCUMENTS

| CN | 101400081 A | 4/2009 |
| CN | 102326353 A | 1/2012 |

(Continued)

OTHER PUBLICATIONS

The Partial Supplementary European Search Report for Application No. 17838410.3 dated Jul. 15, 2019, 12 pages.

(Continued)

*Primary Examiner* — Marsha D Banks Harold
*Assistant Examiner* — Shawna T Stepp Jones
(74) *Attorney, Agent, or Firm* — Womble Bond Dickinson (US) LLP

(57) ABSTRACT

Disclosed in the present application are a method and device for feeding back downlink data. When a processing duration of an UE is shortened, feedback timing information for feeding back downlink data may be adaptively changed. The method comprises: determining a processing capability of an UE, the processing capability referring to a processing duration that the UE takes to process the received downlink data to determine whether said downlink data needs to be retransmitted; according to the determined processing capability, determining the feedback timing information of the UE feeding back the downlink data.

16 Claims, 14 Drawing Sheets

S101 — Determine a processing capability of a User Equipment (UE), where the processing capability refers to a processing duration that the UE takes to process received downlink data to decide whether to retransmit the downlink data S102 — Determine feedback timing information for the UE to make feedback for the downlink data, according to the determined processing capability

(52) U.S. Cl.
CPC .......... *H04L 1/1854* (2013.01); *H04L 1/1861* (2013.01); *H04L 1/1864* (2013.01); *H04L 5/00* (2013.01); *H04W 72/0446* (2013.01)

(56) References Cited

FOREIGN PATENT DOCUMENTS

| | | | |
|---|---|---|---|
| CN | 102752089 | A | 10/2012 |
| CN | 105323857 | A | 2/2016 |
| EP | 3043502 | A1 | 7/2016 |
| EP | 3136644 | A1 | 3/2017 |
| WO | 2009129612 | A1 | 10/2009 |
| WO | 2013/127296 | A1 | 9/2013 |
| WO | 2015/048404 | A1 | 4/2015 |
| WO | 2015172363 | A1 | 11/2015 |

OTHER PUBLICATIONS

The Chinese Office Action for Chinese Application No. 2016106658786 dated Jun. 11, 2019, 7 pages.

Chinese language and an English translation of the International Search Report for International Application No. PCT/CN2017/086271 dated Aug. 23, 2017.

\* cited by examiner

| | 0 | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|---|
| | D | S | U | D | D | D | S | U | D | D | D | S | U | D | D | D | S |
| Process 1 | #0 | | | | | | | A | | | #0 | | | | | | |
| Process 2 | | #1 | | | | | | A | | | #0 | | | | | | |
| Process 3 | | | | #3 | | | | A | | | #0 | | | | | | |
| Process 4 | | | | | #4 | | | A | | | #0 | | | | | | |
| Process 5 | | | | | | #5 | | | | | | | | A | | | #5 |
| Process 6 | | | | | | | #6 | | | | | | | A | | | #5 |
| Process 7 | | | | | | | | #8 | | | | | | A | | | #5 |
| Process 8 | | | | | | | | | | #9 | | | | A | | | #5 |

| D | Downlink subframe | S | Special subframe | U | Uplink subframe |
| #n | PDSCH transmission frame | A | ACK/NACK feedback frame |

Fig. 4

| | 5 | 6 | 7 | 8 | 9 | 0 | 1 | 2 | 3 | 4 | 5 | 6 | 7 | 8 |
|---|---|---|---|---|---|---|---|---|---|---|---|---|---|---|
| | D | D | D | D | D | D | S | U | U | U | D | D | D | D |
| Process 1 | #5 | | | | | | | A | | | #5 | | | |
| Process 2 | | #6 | | | | | | A | | | #5 | | | |
| Process 3 | | | #7 | | | | | A | | | #5 | | | |
| Process 4 | | | | #8 | | | | | A | | | | #6 | |
| Process 5 | | | | | #9 | | | | A | | | | #6 | |
| Process 6 | | | | | | #0 | | | | A | | | | #7 |
| Process 7 | | | | | | | #1 | | | A | | | | #7 |

| D | Downlink subframe | S | Special subframe | U | Uplink subframe |
| #n | PDSCH transmission frame | A | ACK/NACK feedback frame |

Fig. 5a

METHOD AND DEVICE FOR FEEDING BACK DOWNLINK DATA

CROSS REFERENCE TO RELATED APPLICATIONS

This patent application is a U.S. National Stage of International Application No. PCT/CN2017/086271, filed May 27, 2017, which claims priority to Chinese Patent Application No. 201610665878.6, filed with the Chinese Patent Office on Aug. 12, 2016, and entitled "A method and apparatus for making feedback for downlink data", which was incorporated by reference in its entirety.

FIELD

The present invention relates to the field of communications, and particularly to a method and apparatus for making feedback for downlink data.

BACKGROUND

As there is a growing demand for mobile communication services, a number of organizations including the International Telecommunication Union (ITU), etc., have defined higher performance of a user-plane delay as required for future mobile communication systems. Given a Transmission Time Interval (TTI) (e.g., a 1 ms TTI), the user-plane delay performance can be improved by improving the processing capability of a User Equipment (UE), and shortening the processing duration.

Table 1 depicts uplink-downlink configurations of subframes in a Time Division Duplex (TDD) mode in a Long Term Evolution (LTE) system, where the length of a radio frame in the TDD mode is 10 milliseconds, each radio frame includes ten subframes 0 to 0 in total, and the length of a subframe is 1 millisecond; seven uplink-downlink configurations of subframes in total are defined for each radio frame in the prior art, and the configurations are numbered 0 to 6 respectively; and as depicted in Table 1, D is a downlink subframe, U is an uplink subframe, and S is a special subframe.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the LTE system in the TDD mode, for example, the UE receives downlink data in a downlink or special subframe m, and processes and transmits the downlink data in k subframes (k milliseconds), and then can make feedback in a subsequent uplink subframe about whether the downlink data are to be retransmitted, where the feedback includes Acknowledgement (ACK) feedback and Negative Acknowledgement (NACK) feedback. Since the length of time for processing the data is three subframes (3 milliseconds) in the prior art, and the length of time for transmitting the data is one subframe (1 millisecond), for the downlink data received in the downlink or special subframe m, the feedback can be made at earliest in the fourth subframe (k=4) after the downlink or special subframe, and if the fourth subframe is not an uplink subframe, then the feedback may be made in the first uplink subframe after the fourth subframe.

In this way, feedback can be made in an uplink subframe n, for downlink data received in a plurality of downlink or special subframes m, where m=n−k+10β (when n−k<−10, β is 2; when −10≤n−k<0, β is 1, and when n−k≥0, β is 0). Table 2 depicts possible values of k corresponding to respective uplink subframes n in the respective uplink-downlink configurations when the processing duration is three subframes; and feedback timing information for making feedback for downlink data in the prior art can be determined according to Table 2, and an implicit resource of a Physical Uplink Control Channel (PUCCH) for transmitting feedback information can be indicated to the terminal via higher-layering signaling.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

However if the user-plane delay performance is improved by shortening the processing duration, then the feedback timing information for making feedback for downlink data, and the implicit PUCCH resource indicated according to the feedback timing information in the prior art may not be applicable.

Apparently there is such a problem in the prior art the feedback timing information for making feedback for downlink data may not be applicable if the processing duration in the UE is shortened.

SUMMARY

Embodiments of the invention provide a method and apparatus for making feedback for downlink data so as to address the problem in the prior art the feedback timing information for making feedback for downlink data may not be applicable if the processing duration in the UE is shortened.

An embodiment of the invention provides a method for making feedback for downlink data, the method including:
determining a processing capability of a User Equipment (UE), wherein the processing capability refers to a processing duration that the UE takes to process received downlink data to decide whether to retransmit the downlink data; and
determining feedback timing information for the UE to make feedback for the downlink data, according to the determined processing capability.

An embodiment of the invention further provides an apparatus for making feedback for downlink data, the apparatus including:

a processing module configured to determine a processing capability of a User Equipment (UE), wherein the processing capability refers to a processing duration that the UE takes to process received downlink data to decide whether to retransmit the downlink data; and a feedback module configured to determine feedback timing information for the UE to make feedback for the downlink data, according to the determined processing capability.

An embodiment of the invention provides a User Equipment (UE) including:

a processor configured to read and execute program in a memory:

to determine a processing capability of the UE, wherein the processing capability refers to a processing duration that the UE takes to process received downlink data to decide whether to retransmit the downlink data; and to determine feedback timing information for the UE to make feedback for the downlink data, according to the determined processing capability.

An embodiment of the invention further provides a network-side device including:

a processor configured to read and execute program in a memory:

to determine a processing capability of a UE, wherein the processing capability refers to a processing duration that the UE takes to process received downlink data to decide whether to retransmit the downlink data; and to determine feedback timing information for the UE to make feedback for the downlink data, according to the determined processing capability.

Advantageous effects of the invention are as follows.

In the solutions according to the embodiments of the invention, the feedback timing information for the UE to make feedback for the downlink data can be determined respectively according to the different processing capability of the UE, i.e., the different processing duration for the UE to process the received downlink data to decide whether to retransmit the downlink data, and at this time, if the processing duration in the UE is shortened, then the feedback timing information for making feedback for the downlink data will be adapted, and feedback will be made for the downlink data, thus improving the user-plane delay performance.

Other features and advantages of the invention will be set forth in the following description, and will partly become apparent from the description, or will be learned from the practice of the invention. The objects and other advantages of the invention can be achieved and attained using the structures particularly pointed out in the written description, claims and drawings.

BRIEF DESCRIPTION OF THE DRAWINGS

The drawings are intended to provide further understanding of the invention, constitute a part of the specification, and serve together with the embodiments of the invention to explain the invention, but are not intended to limit the invention thereto.

FIG. 4 is a schematic diagram of making feedback for downlink data by a UE in eight processes in a solution according to a fourth embodiment of the invention.

FIG. 5a is a schematic diagram of making feedback for downlink data by a UE in seven processes in a solution according to a fifth embodiment of the invention.

DETAILED DESCRIPTION OF THE EMBODIMENTS

In order to provide a solution to adapt feedback timing information for making feedback for downlink data when the processing duration in a UE is shortened, embodiments of the invention provide a method for making feedback for downlink data, and preferable embodiments of the invention will be described below with reference to the drawings; and it shall be appreciated that the preferable embodiments to be described are only intended to illustrate and explain the invention, but not to limit the invention thereto. The embodiments of the invention, and features in the embodiments can be combined with each other unless they conflict with each other.

First Embodiment

Figure 1:
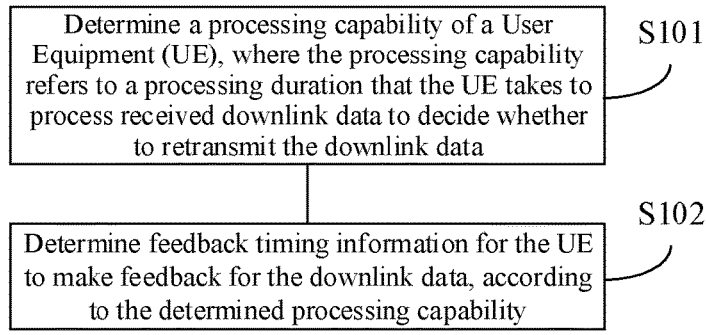
FIG. 1 is a schematic flow chart of a method for making feedback for downlink data according to a first embodiment of the invention.

The first embodiment of the invention provides a method for making feedback for downlink data, and FIG. 1 illustrates a schematic flow chart thereof, where the method can particularly include the following steps.

The step S101 is to determine a processing capability of a User Equipment (UE), where the processing capability refers to a processing duration that the UE takes to process received downlink data to decide whether to retransmit the downlink data.

The step S102 is to determine feedback timing information for the UE to make feedback for the downlink data, according to the determined processing capability.

In a real implementation, both the UE and a network-side device (e.g., an evolved Node B (eNB)) can implement the solution according to the first embodiment of the invention.

When the UE implements the solution, the UE determines the feedback timing information applicable thereto according to its processing capability, and feedback timing information corresponding to different processing capabilities.

When the network-side device implements the solution, it can receive the processing capability reported by the UE, and determine the feedback timing information applicable to the UE according to the processing capability reported by the UE. Particularly the network-side device can transmit all the feedback timing information in respective uplink-downlink configurations adapted to the processing capability of the UE directly to the UE, or can notify the UE of an uplink-downlink configuration to be applied to the UE, and feedback timing information corresponding to the uplink-downlink configuration.

In both of the two particular instances above, the feedback timing information for the UE to make feedback for the downlink data can be determined respectively according to the different processing capability of the UE, i.e., the different processing duration for the UE to process the received downlink data to decide whether to retransmit the downlink data, and at this time, if the processing duration in the UE is shortened, then the feedback timing information for making feedback for the downlink data will be adapted, and feedback will be made for the downlink data, thus improving the user-plane delay performance.

Particularly, in the step S102, if the processing duration corresponding to the processing capability is three subframes, then first feedback timing information for the UE to make data for the downlink data will be determined, where the first feedback timing information is feedback timing information defined in the 3$^{rd}$ Generation Partnership Project Long Term Evolution Release 13 (3GPP LTE Rel-13) and earlier releases; and if the processing duration corresponding to the processing capability is less than three subframes, then second feedback timing information for the UE to make data for the downlink data will be determined, where the shortest duration for the UE to make feedback for the received downlink data according to feedback timing indicated in the second feedback timing information is less than the shortest duration for the UE to make feedback for the received downlink data according to feedback timing indicated in the first feedback timing information.

In a real implementation, if the processing length of time corresponding to the determined processing capability is still three subframes, then still the feedback timing information defined in the 3GPP LTE Rel-13 and earlier releases, that is, the feedback timing information may be determined according to Table 2; and if the processing duration corresponding to the determined processing capability is less than three subframes, that is, the processing duration in the UE is shortened, then the UE may make feedback for the downlink data using new feedback timing information according to the processing duration in the UE.

Then in the instance where the processing duration corresponding to the processing capability is less than three subframes, if the processing duration corresponding to the processing capability is two subframes (two milliseconds), and a transmission length of time is one subframe (one millisecond), then for downlink data received in a subframe (a downlink subframe or a special subframe) m, feedback can be made at earliest in the third subframe (k=3) since the downlink data are received, and if the third subframe is not an uplink subframe, then feedback may be made in the first uplink subframe after the third subframe. In this way, feedback can be made in an uplink subframe n, for downlink data received in a plurality of subframes (downlink subframes or special subframes) m, where m=n−k+10β (when n<k, β is 1, and when n≥k, β is 0). Table 3 depicts possible values of k corresponding to respective uplink subframes n in the respective uplink-downlink configurations when the processing duration is two subframes.

TABLE 3

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | — | 3 | 3 | — | — | — | 3 | 3 |
| 1 | — | — | 3, 6 | 3 | — | — | — | 3, 6 | 3 | — |
| 2 | — | — | 7, 4, 3, 6 | — | — | — | — | 7, 4, 3, 6 | — | — |
| 3 | — | — | 7, 5, 6 | 5, 4 | 4, 3 | — | — | — | — | — |
| 4 | — | — | 8, 7, 6, 11 | 6, 5, 4, 3 | — | — | — | — | — | — |
| 5 | — | — | 12, 9, 8, 7, 5, 4, 3, 11, 6 | — | — | — | — | — | — | — |
| 6 | — | — | 6 | 4 | 4 | — | — | 6 | 3 | — |

Alike if the processing duration corresponding to the processing capability is one subframe (one millisecond), then for downlink data received in a subframe (a downlink subframe or a special subframe) m, feedback may be made at earliest in the third subframe (k=3) after the subframe. Table 4 depicts possible values of k corresponding to respective uplink subframes n in the respective uplink-downlink configurations when the processing duration is one subframe.

TABLE 4

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 2 | 2 | — | — | — | 2 | 2 | — |
| 1 | — | — | 3, 2 | 2 | — | — | — | 3, 2 | 2 | — |
| 2 | — | — | 4, 3, 2, 6 | — | — | — | — | 4, 3, 2, 6 | — | — |
| 3 | — | — | 7, 5, 6 | 5, 4 | 4, 3 | — | — | — | — | — |
| 4 | — | — | 8, 7, 5, 6 | 5, 4, 3, 2 | — | — | — | — | — | — |
| 5 | — | — | 9, 8, 7, 5, 4, 3, 2, 11, 6 | — | — | — | — | — | — | — |
| 6 | — | — | 3 | 3 | 3 | — | — | 2 | 2 | — |

Apparently, feedback timing information for the UE to make feedback for downlink data in the respective uplink-downlink configurations when the processing duration is two subframes or one subframe can be determined according to Table 3 or Table 4, and feedback can be made for the downlink data.

Furthermore, the method according to the first embodiment of the invention can further include: determining the largest number of Hybrid Automatic Repeat Request (HARQ) processes for the UE to make feedback for downlink data, according to the determined processing capability, and uplink-downlink configuration information of the UE.

Particularly, the largest number of HARQ processes for the UE to make feedback for the downlink data given a processing capability and uplink-downlink configuration can be determined according to the determined feedback timing information. Table 5 lists the largest numbers of HARQ processes in the respective uplink-downlink configurations when the processing duration is two subframes, and Table 6 lists the largest numbers of HARQ processes in the respective uplink-downlink configurations when the processing duration is one subframe.

TABLE 5

| Uplink-downlink configuration | The largest number of HARQ processes |
|---|---|
| 0 | 3 |
| 1 | 5 |
| 2 | 8 |
| 3 | 7 |
| 4 | 10 |
| 5 | 13 |
| 6 | 5 |

TABLE 6

| Uplink-downlink configuration | The largest number of HARQ processes |
|---|---|
| 0 | 2 |
| 1 | 3 |
| 2 | 6 |
| 3 | 7 |
| 4 | 8 |
| 5 | 12 |
| 6 | 5 |

In this way, particular flows of the UE to make feedback for downlink data in a plurality of processes in the respective uplink-downlink configurations when the processing duration is two subframes can be determined according to Table 3 and Table 5. Alike particular flows of the UE to make feedback for downlink data in a plurality of processes in the respective uplink-downlink configurations when the processing duration is one subframe can be determined according to Table 4 and Table 6.

Furthermore, after the step S102, the method can further include: if feedback is made in an uplink subframe n, for downlink data received in subframes n−k+10β in an uplink-downlink configuration with a configuration number L, then determining the same subframe as a subframe indicated in third feedback timing information among the subframes n−k+10β, where the subframe indicated in the third feedback timing information refers to a subframe, in which downlink data are transmitted, corresponding to feedback information transmitted in an uplink subframe n in an uplink-downlink configuration with a configuration number L (where L is a non-negative integer) according to feedback timing designed for a UE with a processing duration being three subframes (i.e., a subframe, in which downlink data are transmitted, for which feedback is made in the uplink subframe n, or a subframe for transmitting downlink data for which feedback is made in the uplink subframe n; for the determined same subframe, sharing an implicit PUCCH resource for transmitting feedback information, with the UE with the processing duration being three subframes; and for any one of the other subframes among the subframes n−k+10β than the determined same subframe, determining an implicit PUCCH resource, for transmitting feedback information, indicated in higher-layer signaling, or determining an implicit PUCCH resource for transmitting feedback information under a predefined rule.

Stated otherwise, in the uplink-downlink configuration with the configuration number L, for the UE with a processing duration being less than three subframes, feedback is made in the uplink subframe n, for downlink data received in the subframe m; and for the UE with a processing duration being three subframes, feedback is also made in the uplink subframe n, for downlink data received in the subframe m, so in this instance, for the subframe m, an implicit PUCCH resource for transmitting feedback information can be shared with the UE with a processing duration being three subframes. For any one of the other subframes than the instance above, an implicit PUCCH resource indicated in higher-layer signaling can be determined, or an implicit PUCCH resource can be determined under a predefined rule.

Particularly, for any one of the other subframes among the subframes n−k+10β than the determined same subframe, determining an implicit PUCCH resource for transmitting feedback information under the predefined rule can include: for any one of the other subframes among the subframes n−k+10β than the determined same subframe, determining a start point of the implicit PUCCH resource indicated in higher-layer signaling, and determining the implicit PUCCH resource for transmitting feedback information, according to the start point, and the index of a first Control Channel Element (CCE) for transmitting a Physical Downlink Control Channel (PDCCH) in the any one subframe, where the start point is different from a start point of an implicit PUCCH resource over which the UE with the processing duration being three subframes transmits feedback information.

As described above, for any one of the other subframes than the instance above, a new implicit PUCCH resource can be determined under a predefined rule, where the predefined rule can particularly be that a start point of the new PUCCH is determined according to high-layer signaling, and the new implicit PUCCH resource is determined according to the start point, and the index of a first CCE for transmitting a PDCCH in the any one subframe.

Apparently, the method for making feedback for downlink data according to the first embodiment of the invention can adapt feedback timing information for making feedback for downlink data when a processing duration of a UE is shortened.

The method according to the first embodiment of the invention will be described below in details in connection with a second embodiment to a fourteenth embodiment of the invention with reference to the drawings.

Second Embodiment when a processing duration corresponding to a processing capability of a UE to process received downlink data is two subframes, and a configuration number corresponding to uplink-downlink configuration information is 0, feedback is made in an uplink subframe n, for downlink data received in a subframe n−k+10β, where when n is 3, 4, 8, or 9, k is 3, where β is 0;

the number of HARQ processes for the UE to make feedback for the downlink data is determined as 3 according to the processing capability and the uplink-downlink configuration information; and for a subframe 0, a subframe 1, a subframe 5, and a subframe 6, an implicit PUCCH resource, for transmitting feedback information, indicated in high-layer signaling is determined, or an implicit PUCCH resource for transmitting feedback information is determined under a predefined rule.

Figure 2:
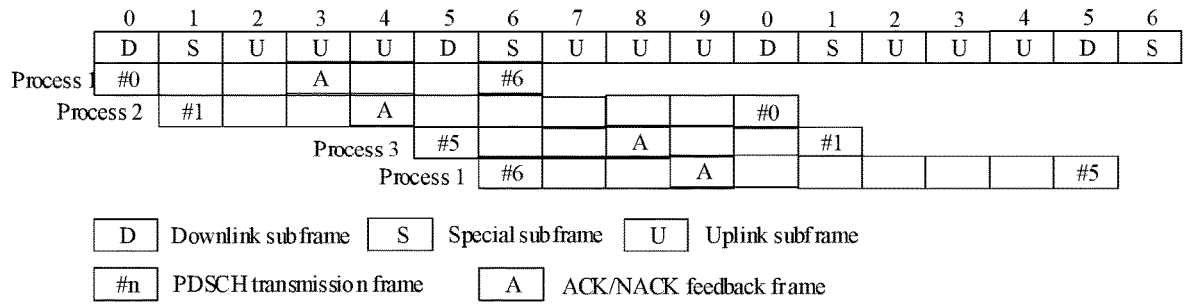
FIG. 2 is a schematic diagram of making feedback for downlink data by a UE in three processes in a solution according to a second embodiment of the invention.

FIG. 2 illustrates a schematic diagram of making feedback for downlink data by a UE in three processes in the solution according to the second embodiment of the invention, where a PDSCH transmission frame stands for a Physical Downlink Shared Channel (PDSCH) transmission frame.

Third Embodiment when a processing duration corresponding to a processing capability of a UE to process received downlink data is two subframes, and a configuration number corresponding to uplink-downlink configuration information is 1, feedback is made in an uplink subframe n, for downlink data received in a subframe n−k+10β, where when n is 2 or 7, k is 3 and 6, and when n is 3 or 8, k is 3, where when n<k, β is 1, and when n≥k, β is 0;

the number of HARQ processes for the UE to make feedback for the downlink data is determined as 5 according to the processing capability and the uplink-downlink configuration information;

for a subframe 1 and a subframe 6, an implicit PUCCH resource for transmitting feedback information is shared with a UE with a processing duration being three subframes; and for a subframe 0, a subframe 4, a subframe 5, and a subframe 9, an implicit PUCCH resource for transmitting feedback information, indicated in high-layer signaling is determined, or an implicit PUCCH resource for transmitting feedback information is determined under a predefined rule.

Figure 3:
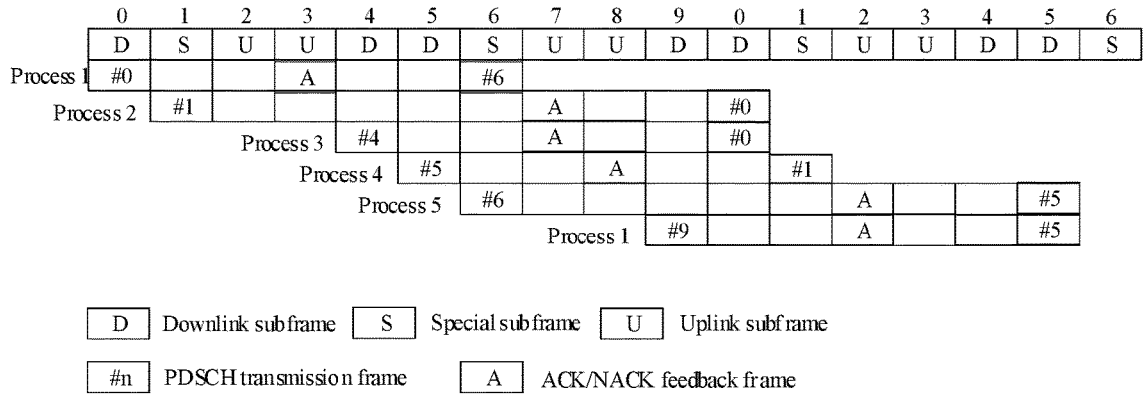
FIG. 3 is a schematic diagram of making feedback for downlink data by a UE in five processes in a solution according to a third embodiment of the invention.

FIG. 3 illustrates a schematic diagram of making feedback for downlink data by a UE in five processes in the solution according to the third embodiment of the invention.

Four Embodiment when a processing duration corresponding to a processing capability of a UE to process received downlink data is two subframes, and a configuration number corresponding to uplink-downlink configuration information is 2, feedback is made in an uplink subframe n, for downlink data received in a subframe n−k+10β, where when n is 2 or 7, k is 7, 4, 3, and 6, where when n<k, β is 1, and when n≥k, β is 0;

the number of HARQ processes for the UE to make feedback for the downlink data is determined as 8 according to the processing capability and the uplink-downlink configuration information;

for a subframe 0, a subframe 1, a subframe 3, a subframe 5, a subframe 6, and a subframe 8, an implicit PUCCH resource for transmitting feedback information is shared with a UE with a processing duration being three subframes; and for a subframe 4 and a subframe 9, an implicit PUCCH resource, for transmitting feedback information, indicated in high-layer signaling is determined, or an implicit PUCCH resource for transmitting feedback information is determined under a predefined rule.

FIG. 4 illustrates a schematic diagram of making feedback for downlink data by a UE in eight processes in the solution according to the fourth embodiment of the invention.

Fifth Embodiment when a processing duration corresponding to a processing capability of a UE to process received downlink data is two subframes, and a configuration number corresponding to uplink-downlink configuration information is 3, feedback is made in an uplink subframe n, for downlink data received in a subframe n−k+10β, where when n is 2, k is 7, 5, and 6; when n is 3, k is 5 and 4; and when n is 4, k is 4 and 3, where when n<k, β is 1, and when n≥k, β is 0;

the number of HARQ processes for the UE to make feedback for the downlink data is determined as 7 according to the processing capability and the uplink-downlink configuration information;

for a subframe 0, a subframe 5, a subframe 6, and a subframe 8, an implicit PUCCH resource for transmitting feedback information is shared with a UE with a processing duration being three subframes; and for a subframe 1, a subframe 7, and a subframe 9, an implicit PUCCH resource, for transmitting feedback information, indicated in high-layer signaling is determined, or an implicit PUCCH resource for transmitting feedback information is determined under a predefined rule.

Figure 5B:
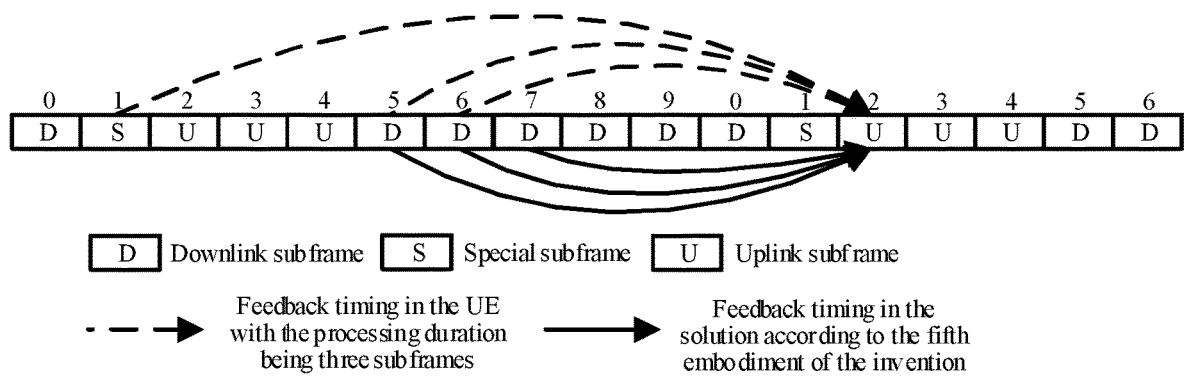
FIG. 5b is a schematic diagram of feedback timing in an uplink subframe 2 respectively in a UE with the processing duration being three subframes, and in the solution according to the fifth embodiment of the invention.
Figure 5C:
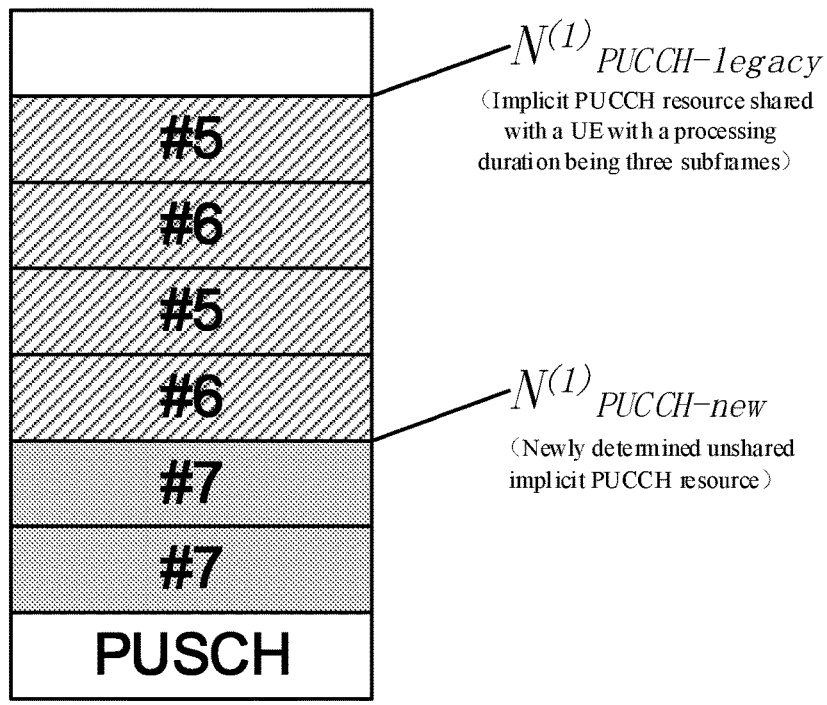
FIG. 5c is a schematic diagram of allocated implicit PUCCH resources for transmitting feedback information in the uplink subframe 2 according to the fifth embodiment of the invention.

FIG. 5a illustrates a schematic diagram of making feedback for downlink data by a UE in seven processes in the solution according to the fifth embodiment of the invention. FIG. 5b illustrates a schematic diagram of feedback timing in an uplink subframe 2 respectively in the UE with the processing duration being three subframes, and in the solution according to the fifth embodiment of the invention, and FIG. 5c illustrates a schematic diagram of allocated implicit PUCCH resources for transmitting feedback information in the uplink subframe 2 according to the fifth embodiment of the invention, where a PUSCH stands for a Physical Uplink Shared Channel (PUSCH).

Sixth Embodiment when a processing duration corresponding to a processing capability of a UE to process received downlink data is two subframes, and a configuration number corresponding to uplink-downlink configuration information is 4, feedback is made in an uplink subframe n, for downlink data received in a subframe n−k+10β, where when n is 2, k is 8, 7, 6, and 11, and when n is 3, k is 6, 5, 4, and 3, where when n<k, β is 1, and when n≥k, β is 0;

the number of HARQ processes for the UE to make feedback for the downlink data is determined as 10 according to the processing capability and the uplink-downlink configuration information;

for a subframe 1, a subframe 4, a subframe 5, a subframe 7, a subframe 8, and a subframe 9, an implicit PUCCH resource for transmitting feedback information is shared with a UE with a processing duration being three subframes; and for a subframe 0 and a subframe 6, an implicit PUCCH resource, for transmitting feedback information, indicated in high-layer signaling is determined, or an implicit PUCCH resource for transmitting feedback information is determined under a predefined rule.

Figure 6:
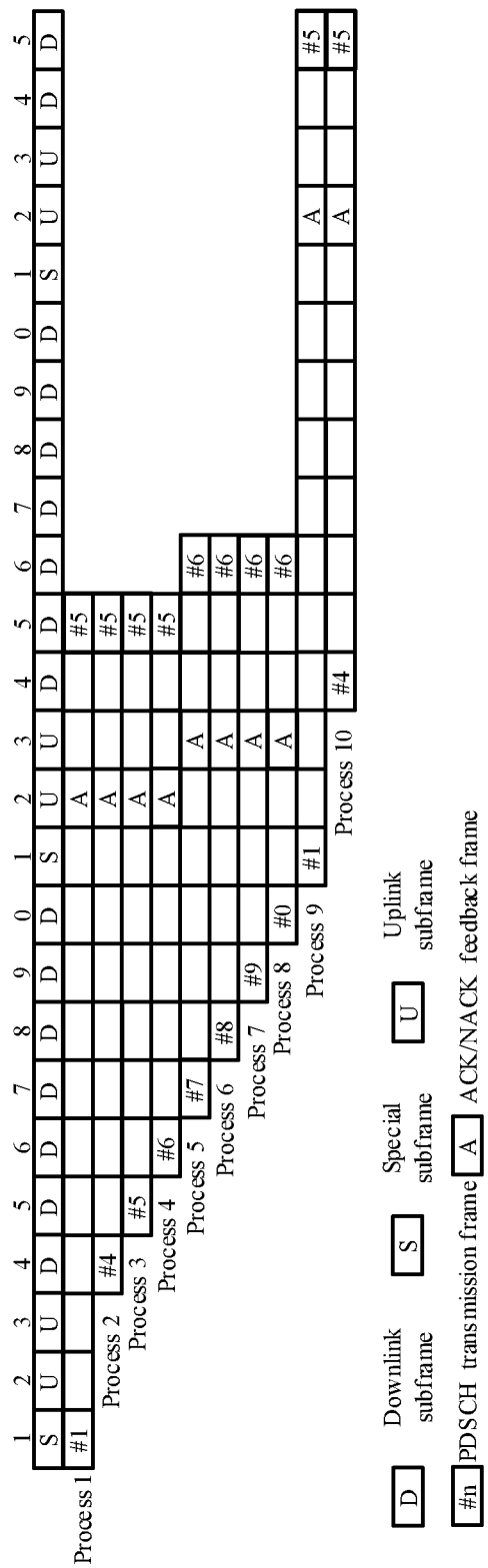
FIG. 6 is a schematic diagram of making feedback for downlink data by a UE in ten processes in a solution according to a sixth embodiment of the invention.

FIG. 6 illustrates a schematic diagram of making feedback for downlink data by a UE in ten processes in the solution according to the sixth embodiment of the invention.

Seventh Embodiment when a processing duration corresponding to a processing capability of a UE to process received downlink data is two subframes, and a configuration number corresponding to uplink-downlink configuration information is 5, feedback is made in an uplink subframe n, for downlink data received in a subframe n−k+10β, where when n is 2, k is 12, 9, 8, 7, 5, 4, 3, 11, and 6, where when n<k, β is 1, and when n≥k, β is 0;

the number of HARQ processes for the UE to make feedback for the downlink data is determined as 13 according to the processing capability and the uplink-downlink configuration information;

for a subframe 0, a subframe 1, a subframe 3, a subframe 4, a subframe 5, a subframe 6, a subframe 7, and a subframe 8, an implicit PUCCH resource for transmitting feedback information is shared with a UE with a processing duration being three subframes; and for a subframe 9, an implicit PUCCH resource, for transmitting feedback information, indicated in high-layer signaling is determined, or an implicit PUCCH resource for transmitting feedback information is determined under a predefined rule.

Figure 7:
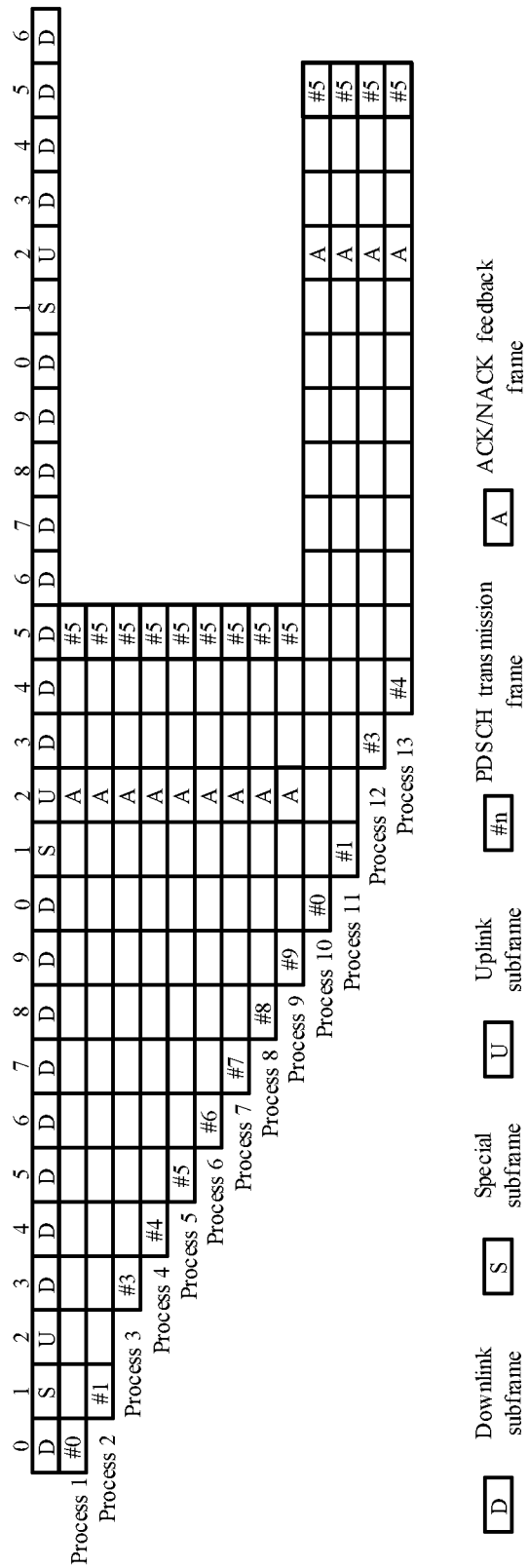
FIG. 7 is a schematic diagram of making feedback for downlink data by a UE in thirteen processes in a solution according to a seventh embodiment of the invention.

FIG. 7 illustrates a schematic diagram of making feedback for downlink data by a UE in thirteen processes in the solution according to the seventh embodiment of the invention.

Eighth Embodiment when a processing duration corresponding to a processing capability of a UE to process received downlink data is two subframes, and a configuration number corresponding to uplink-downlink configuration information is 6, feedback is made in an uplink subframe n, for downlink data received in a subframe n−k+10β, where when n is 2 or 7, k is 6; when n is 3 or 4, k is 4; and when n is 8, k is 3, where when n<k, β is 1, and when n≥k, β is 0;

the number of HARQ processes for the UE to make feedback for the downlink data is determined as 13 according to the processing capability and the uplink-downlink configuration information; and for a subframe 0, a subframe 1, a subframe 5, a subframe 6, and a subframe 9, an implicit PUCCH resource, for transmitting feedback information, indicated in high-layer signaling is determined, or an implicit PUCCH resource for transmitting feedback information is determined under a predefined rule.

Figure 8:
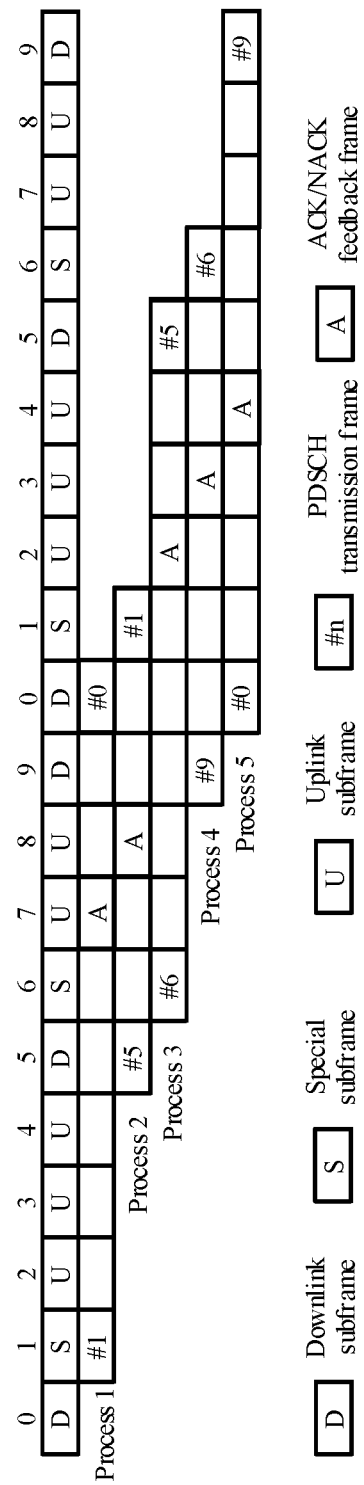
FIG. 8 is a schematic diagram of making feedback for downlink data by a UE in five processes in a solution according to an eighth embodiment of the invention.

FIG. 8 illustrates a schematic diagram of making feedback for downlink data by a UE in five processes in the solution according to the eighth embodiment of the invention.

Ninth Embodiment when a processing duration corresponding to a processing capability of a UE to process received downlink data is one subframe, and a configuration number corresponding to uplink-downlink configuration information is 0, feedback is made in an uplink subframe n, for downlink data received in a subframe n−k+10β, where when n is 2, 3, 7, or 8, k is 2, where β is 0;

the number of HARQ processes for the UE to make feedback for the downlink data is determined as 2 according to the processing capability and the uplink-downlink configuration information; and for a subframe 0, a subframe 1, a subframe 5, and a subframe 6, an implicit PUCCH resource, for transmitting feedback information, indicated in high-layer signaling is determined, or an implicit PUCCH resource for transmitting feedback information is determined under a predefined rule.

Figure 9:
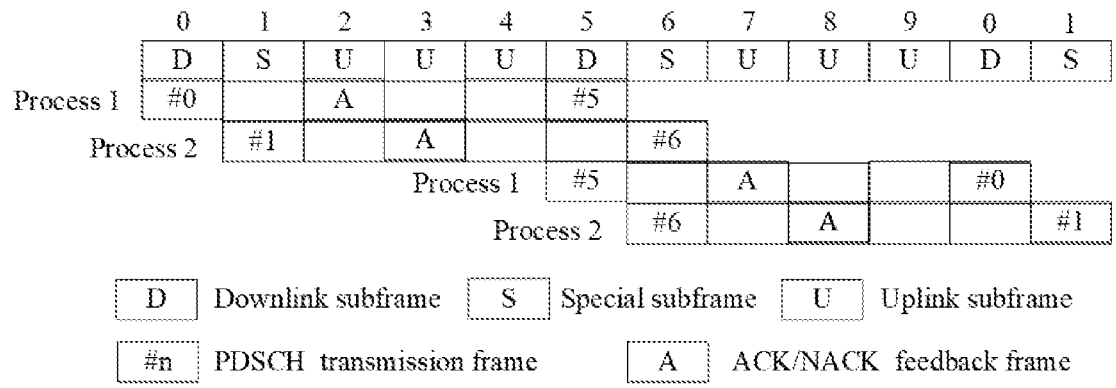
FIG. 9 is a schematic diagram of making feedback for downlink data by a UE in two processes in a solution according to a ninth embodiment of the invention.

FIG. 9 illustrates a schematic diagram of making feedback for downlink data by a UE in two processes in the solution according to the ninth embodiment of the invention.

Tenth Embodiment when a processing duration corresponding to a processing capability of a UE to process received downlink data is one subframe, and a configuration number corresponding to uplink-downlink configuration information is 1, feedback is made in an uplink subframe n, for downlink data received in a subframe n−k+10β, where when n is 2 or 7, k is 3 and 2, and when n is 3 or 8, k is 2, where when n<k, β is 1, and when n≥k, β is 0;

the number of HARQ processes for the UE to make feedback for the downlink data is determined as 3 according to the processing capability and the uplink-downlink configuration information; and for a subframe 0, a subframe 1, a subframe 4, a subframe 5, a subframe 6, and a subframe 9, an implicit PUCCH resource, for transmitting feedback information, indicated in high-layer signaling is determined, or an implicit PUCCH resource for transmitting feedback information is determined under a predefined rule.

Figure 10:
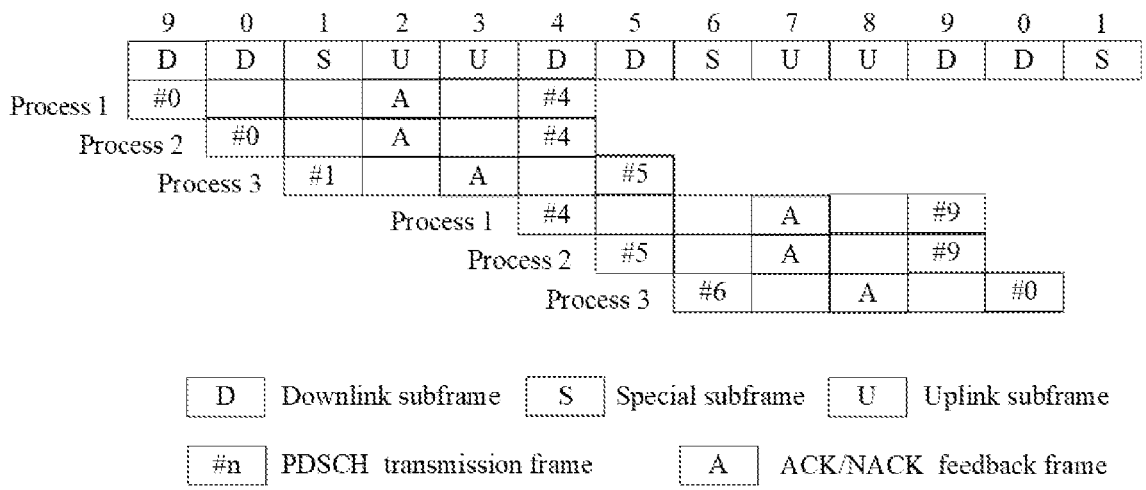
FIG. 10 is a schematic diagram of making feedback for downlink data by a UE in three processes in a solution according to a tenth embodiment of the invention.
Figure 11:
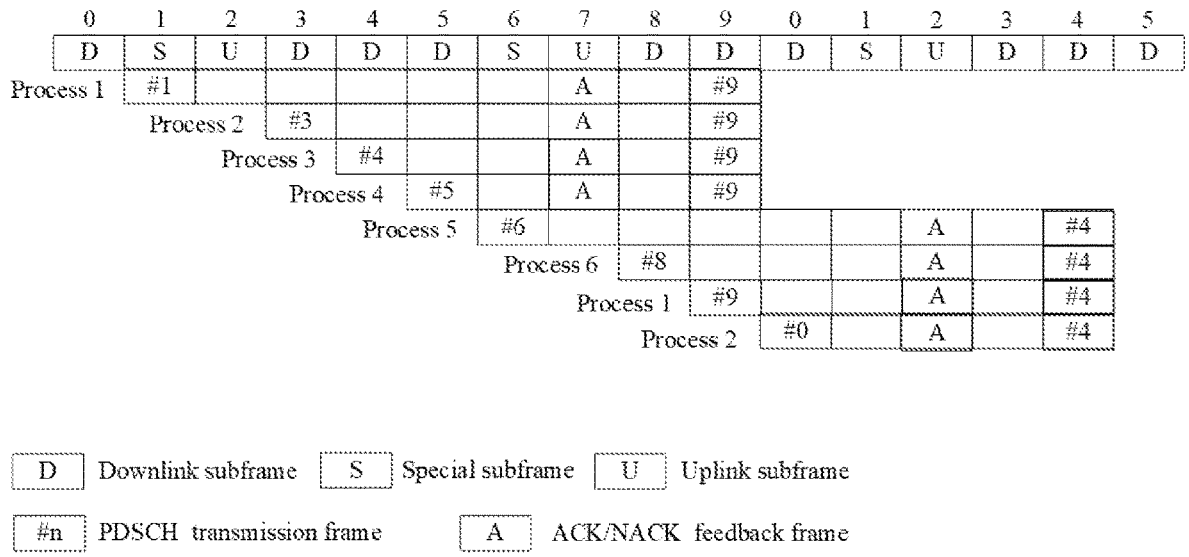
FIG. 11 is a schematic diagram of making feedback for downlink data by a UE in six processes in a solution according to an eleventh embodiment of the invention.

FIG. 10 illustrates a schematic diagram of making feedback for downlink data by a UE in three processes in the solution according to the tenth embodiment of the invention.

Eleventh Embodiment when a processing duration corresponding to a processing capability of a UE to process received downlink data is one subframe, and a configuration number corresponding to uplink-downlink configuration information is 2, feedback is made in an uplink subframe n, for downlink data received in a subframe n−k+10β, where when n is 2 or 7, k is 4, 3, 2, and 6, where when n<k, β is 1, and when n≥k, β is 0;

the number of HARQ processes for the UE to make feedback for the downlink data is determined as 6 according to the processing capability and the uplink-downlink configuration information;

for a subframe 1, a subframe 3, a subframe 6, and a subframe 8, an implicit PUCCH resource for transmitting feedback information is shared with a UE with a processing duration being three subframes; and for a subframe 0, a subframe 4, a subframe 5, and a subframe 9, an implicit PUCCH resource, for transmitting feedback information, indicated in high-layer signaling is determined, or an implicit PUCCH resource for transmitting feedback information is determined under a predefined rule.

Figure 12:
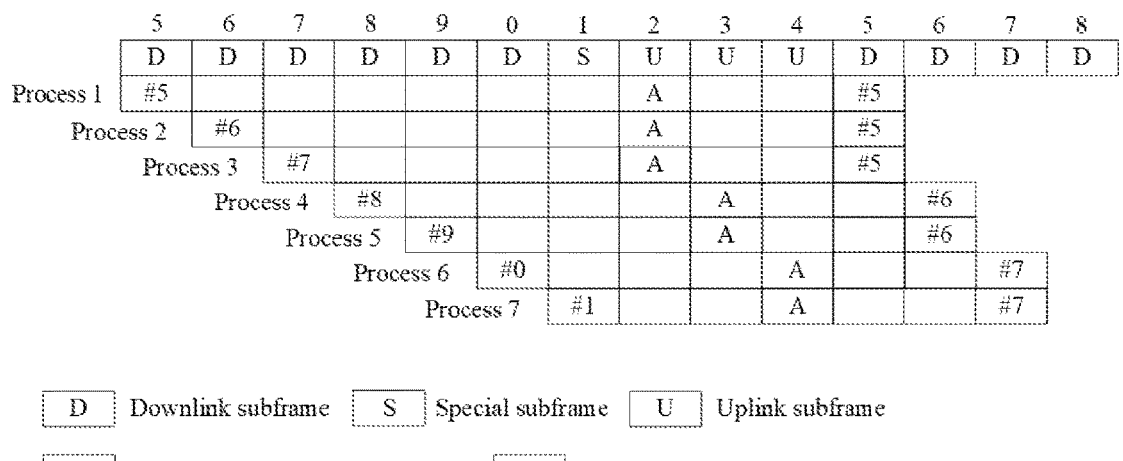
FIG. 12 is a schematic diagram of making feedback for downlink data by a UE in seven processes in a solution according to a twelfth embodiment of the invention.

FIG. 12 illustrates a schematic diagram of making feedback for downlink data by a UE in six processes in the solution according to the eleventh embodiment of the invention.

Twelfth Embodiment when a processing duration corresponding to a processing capability of a UE to process received downlink data is one subframe, and a configuration number corresponding to uplink-downlink configuration information is 3, feedback is made in an uplink subframe n, for downlink data received in a subframe n−k+10β, where when n is 2, k is 7, 5, and 6; when n is 3, k is 5 and 4; and when n is 4, k is 4 and 3, where when n<k, β is 1, and when n≥k, β is 0;

the number of HARQ processes for the UE to make feedback for the downlink data is determined as 7 according to the processing capability and the uplink-downlink configuration information;

for a subframe 0, a subframe 5, a subframe 6, and a subframe 8, an implicit PUCCH resource for transmitting feedback information is shared with a UE with a processing duration being three subframes; and for a subframe 1, a subframe 7, and a subframe 9, an implicit PUCCH resource, for transmitting feedback information, indicated in high-layer signaling is determined, or an implicit PUCCH resource for transmitting feedback information is determined under a predefined rule.

FIG. 12 illustrates a schematic diagram of making feedback for downlink data by a UE in seven processes in the solution according to the twelfth embodiment of the invention.

Thirteenth Embodiment when a processing duration corresponding to a processing capability of a UE to process received downlink data is one subframe, and a configuration number corresponding to uplink-downlink configuration information is 4, feedback is made in an uplink subframe n, for downlink data received in a subframe n−k+10β, where when n is 2, k is 8, 7, 5, and 6; when n is 3, k is 5 and 4; and when n is 3, k is 5, 4, 3, and 2, where when n<k, β is 1, and when n≥k, β is 0;

the number of HARQ processes for the UE to make feedback for the downlink data is determined as 8 according to the processing capability and the uplink-downlink configuration information;

for a subframe 4, a subframe 5, a subframe 8, and a subframe 9, an implicit PUCCH resource for transmitting feedback information is shared with a UE with a processing duration being three subframes; and for a subframe 0, a subframe 1, a subframe 6, and a subframe 7, an implicit PUCCH resource, for transmitting feedback information, indicated in high-layer signaling is determined, or an implicit PUCCH resource for transmitting feedback information is determined under a predefined rule.

Figure 13:
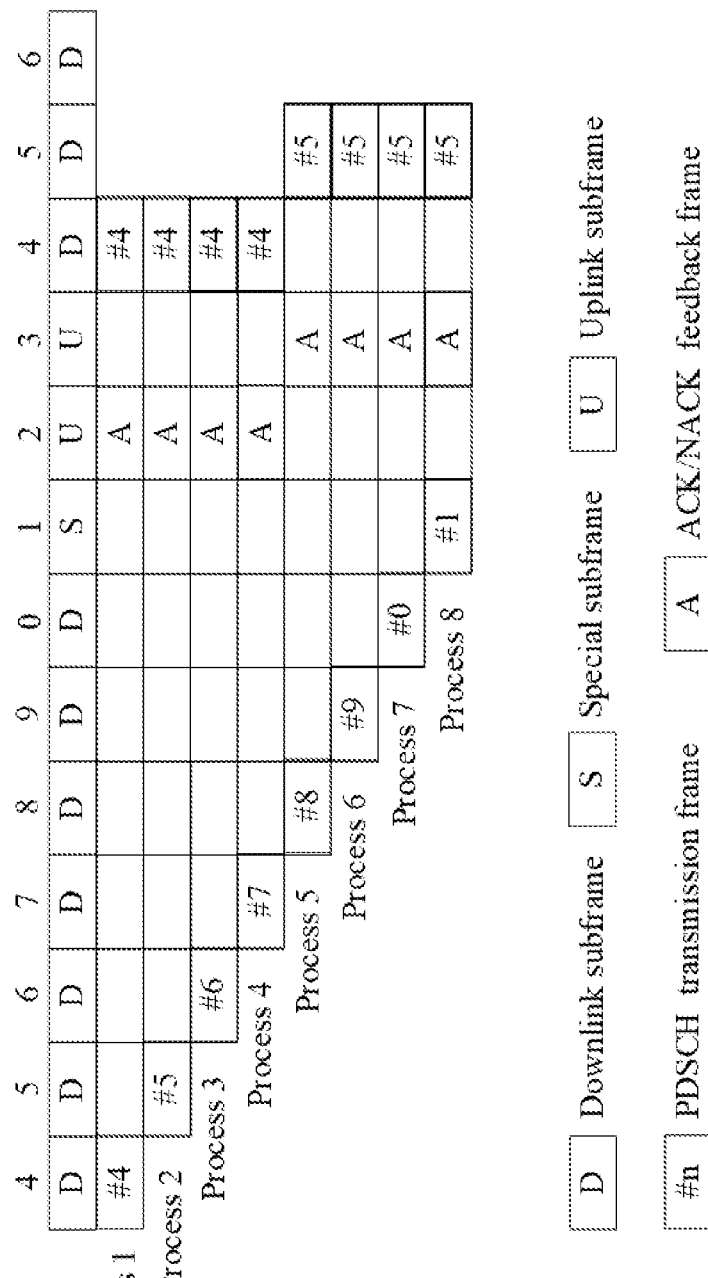
FIG. 13 is a schematic diagram of making feedback for downlink data by a UE in eight processes in a solution according to a thirteenth embodiment of the invention.

FIG. 13 illustrates a schematic diagram of making feedback for downlink data by a UE in eight processes in the solution according to the thirteenth embodiment of the invention.

Fourteenth Embodiment when a processing duration corresponding to a processing capability of a UE to process received downlink data is one subframe, and a configuration number corresponding to uplink-downlink configuration information is 5, feedback is made in an uplink subframe n, for downlink data received in a subframe n−k+10β, where when n is 2, k is 9, 8, 7, 5, 4, 3, 2, 11, and 6, where when n<k, β is 1, and when n≥k, β is 0;

the number of HARQ processes for the UE to make feedback for the downlink data is determined as 12 according to the processing capability and the uplink-downlink configuration information;

for a subframe a subframe 1, a subframe 3, a subframe 4, a subframe 5, a subframe 6, a subframe 7, and a subframe 8, an implicit PUCCH resource for transmitting feedback information is shared with a UE with a processing duration being three subframes; and for a subframe 0 and a subframe 9, an implicit PUCCH resource, for transmitting feedback information, indicated in high-layer signaling is determined, or an implicit PUCCH resource for transmitting feedback information is determined under a predefined rule.

Figure 14:
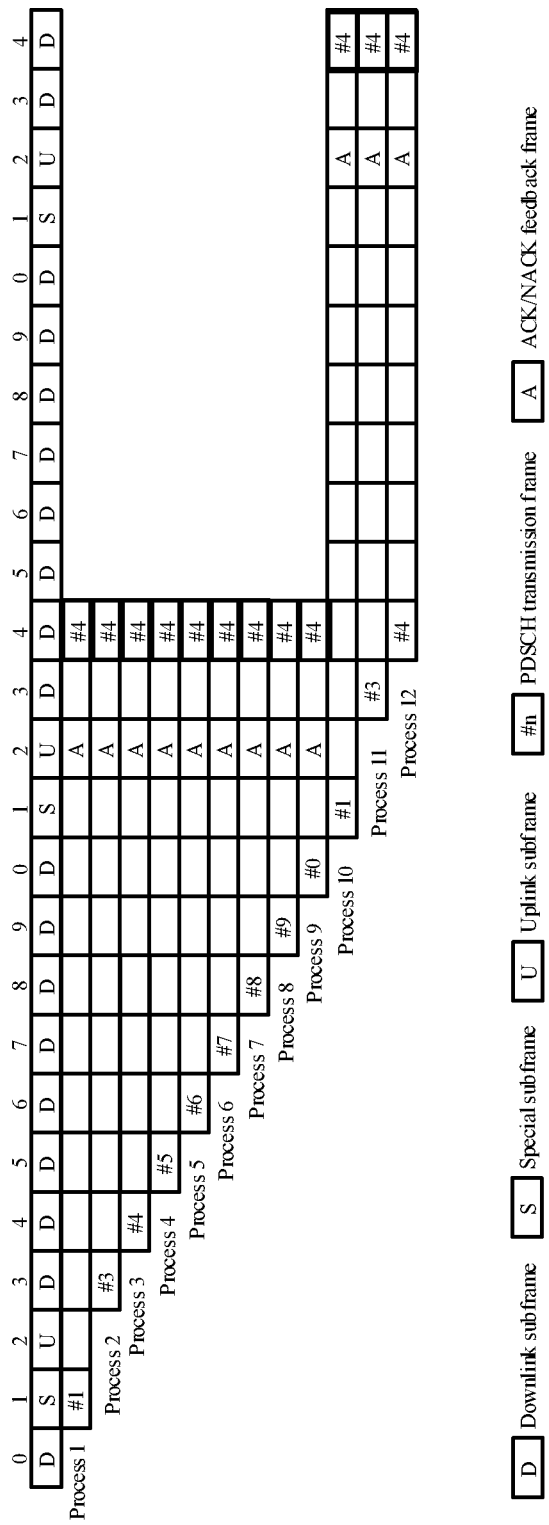
FIG. 14 is a schematic diagram of making feedback for downlink data by a UE in twelve processes in a solution according to a fourteenth embodiment of the invention.

FIG. 14 illustrates a schematic diagram of making feedback for downlink data by a UE in twelve processes in the solution according to the fourteenth embodiment of the invention.

Fifteenth Embodiment when a processing duration corresponding to a processing capability of a UE to process received downlink data is one subframe, and a configuration number corresponding to uplink-downlink configuration information is 6, feedback is made in an uplink subframe n, for downlink data received in a subframe n−k+10β, where when n is 2, 3, or 4, k is 3, and when n is 7 or 8, k is 2, where when n<k, β is 1, and when n≥k, β is 0;

the number of HARQ processes for the UE to make feedback for the downlink data is determined as 5 according to the processing capability and the uplink-downlink configuration information; and for a subframe 0, a subframe 1, a subframe 5, a subframe 6, and a subframe 9, an implicit PUCCH resource, for transmitting feedback information, indicated in high-layer signaling is determined, or an implicit PUCCH resource for transmitting feedback information is determined under a predefined rule.

Figure 15:
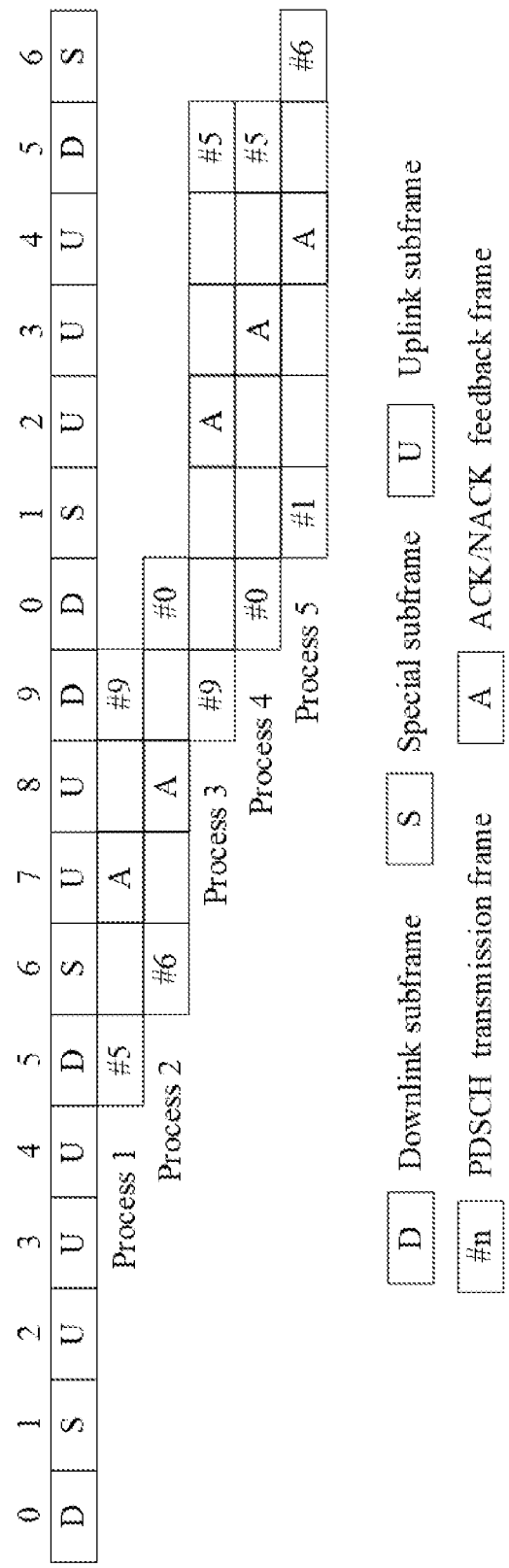
FIG. 15 is a schematic diagram of making feedback for downlink data by a UE in five processes in a solution according to a fifth embodiment of the invention.

FIG. 15 illustrates a schematic diagram of making feedback for downlink data by a UE in five processes in the solution according to the fifteenth embodiment of the invention.

In summary, the method for making feedback for downlink data according to the second to fifteenth embodiments of the invention can adapt feedback timing information for making feedback for downlink data when a processing duration of a UE is shortened.

Sixteenth Embodiment based upon the same inventive idea, in correspondence to the method for making feedback for downlink data according to the embodiment above of the invention, the sixteenth embodiment of the invention further provides an apparatus for making feedback for downlink data, and reference can be made to the embodiment of the method above for a particular implementation of the apparatus, so a repeated description thereof will be omitted here.

Figure 16A:
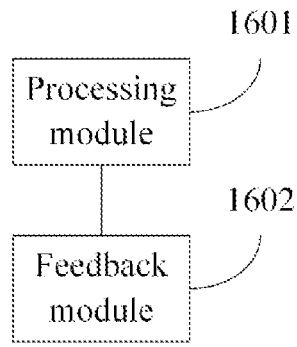
FIG. 16a is a first schematic structural diagram of an apparatus for making feedback for downlink data according to a sixteenth embodiment of the invention.

The sixteenth embodiment of the invention further provides an apparatus for making feedback for downlink data, and FIG. 16a illustrates a schematic structural diagram thereof, where the apparatus can particularly include:

a processing module 1601 is configured to determine a processing capability of a User Equipment (UE), where the processing capability refers to a processing duration that the UE takes to process received downlink data to decide whether to retransmit the downlink data; and a feedback module 1602 is configured to determine feedback timing information for the UE to make feedback for the downlink data, according to the determined processing capability.

Particularly, the feedback module 1602 can be configured: if the processing duration corresponding to the processing capability is three subframes, to determine first feedback timing information for the UE to make data for the downlink data, where the first feedback timing information is feedback timing information defined in the GPP LTE Rel-13 and earlier releases; and if the processing duration corresponding to the processing capability is less than three subframes, to determine second feedback timing information for the UE to make data for the downlink data, where the shortest duration for the UE to make feedback for the received downlink data according to feedback timing indicated in the second feedback timing information is less than the shortest duration for the UE to make feedback for the received downlink data according to feedback timing indicated in the first feedback timing information.

Particularly the feedback module 1602 can be configured: if the processing duration corresponding to the processing capability is two subframes, to decide to make feedback for downlink data in a subframe n−k+10β, in an uplink subframe n, where when n<k, β is 1, and when n≥k, β is 0, where if a configuration number corresponding to uplink-downlink configuration information is 0, then when n is 3, 4, 8, or 9, k is 3; if the configuration number corresponding to the uplink-downlink configuration information is 1, then when n is 2 or 7, k is 3 and 6, and when n is 3 or 8, k is 3; if the configuration number corresponding to the uplink-downlink configuration information is 2, then when n is 2 or 7, k is 7, 4, 3, and 6; if the configuration number corresponding to the uplink-downlink configuration information is 3, then when n is 2, k is 7, 5, and 6, when n is 3, k is 5 and 4, and when n is 4, k is 4 and 3; if the configuration number corresponding to the uplink-downlink configuration information is 4, then when n is 2, k is 8, 7, 6, and 11, and when n is 3, k is 6, 5, 4, and 3; if the configuration number corresponding to the uplink-downlink configuration information is 5, then when n is 2, k is 12, 9, 8, 7, 5, 4, 3, 11, and 6; and if the configuration number corresponding to the uplink-downlink configuration information is 6, then when n is 2 or 7, k is 6, when n is 3 or 4, k is 4, and when n is 8, k is 3.

Particularly, the feedback module 1602 can be configured: if the processing duration corresponding to the processing capability is one subframe, to decide to make feedback for downlink data in a subframe n−k+10β, in an uplink subframe n, where when n<k, β is 1, and when n≥k, β is 0, where if a configuration number corresponding to uplink-downlink configuration information is 0, then when n is 2, 3, 7, or 8, k is 2; if the configuration number corresponding to the uplink-downlink configuration information is 1, then when n is 2 or 7, k is 3 and 2, and when n is 3 or 8, k is 2; if the configuration number corresponding to the uplink-downlink configuration information is 2, then when n is 2 or 7, k is 4, 3, 2, and 6; if the configuration number corresponding to the uplink-downlink configuration information is 3, then when n is 2, k is 7, 5, and 6, when n is 3, k is 5 and 4, and when n is 4, k is 4 and 3; if the configuration number corresponding to the uplink-downlink configuration information is 4, then when n is 2, k is 8, 7, 5, and 6, and when n is 3, k is 5, 4, 3, and 2; if the configuration number corresponding to the uplink-downlink configuration information is 5, then when n is 2, k is 9, 8, 7, 5, 4, 3, 2, 11, and 6; and if the configuration number corresponding to the uplink-downlink configuration information is 6, then when n is 2, 3, or 4, k is 3, and when n is 7 or 8, k is 2.

Figure 16B:
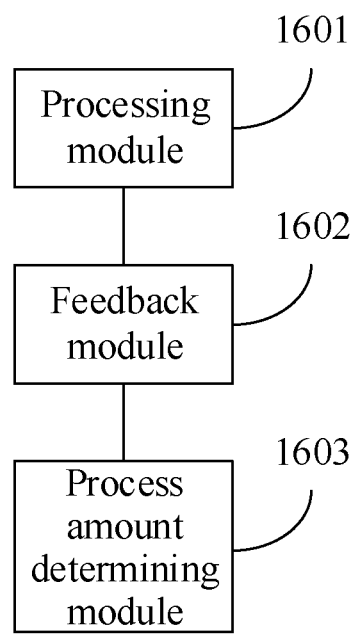
FIG. 16b is a second schematic structural diagram of an apparatus for making feedback for downlink data according to the sixteenth embodiment of the invention.

Furthermore, as illustrated in FIG. 16b, the apparatus according to the sixteenth embodiment of the invention can further include:

A process amount determining module 1603 is configured to determine the largest number of HARQ processes for the UE to make feedback for the downlink data, according to the determined processing capability, and uplink-downlink configuration information of the UE.

Particularly, process amount determining module 1603 can be configured: when the processing duration corresponding to the processing capability is two subframes, if a configuration number corresponding to the uplink-downlink configuration information is 0, to determine the largest number of HARQ processes as 3; if the configuration number corresponding to the uplink-downlink configuration information is 1, to determine the largest number of HARQ processes as 5; if the configuration number corresponding to the uplink-downlink configuration information is 2, to determine the largest number of HARQ processes as 8; if the configuration number corresponding to the uplink-downlink configuration information is 3, to determine the largest number of HARQ processes as 7; if the configuration number corresponding to the uplink-downlink configuration information is 4, to determine the largest number of HARQ processes as 10; if the configuration number corresponding to the uplink-downlink configuration information is 5, to determine the largest number of HARQ processes as 13; and if the configuration number corresponding to the uplink-downlink configuration information is 6, to determine the largest number of HARQ processes as 5.

Particularly, a process amount determining module 1603 can be configured: when the processing duration corresponding to the processing capability is one subframe, if a configuration number corresponding to the uplink-downlink configuration information is 0, to determine the largest number of HARQ processes as 2; if the configuration number corresponding to the uplink-downlink configuration information is 1, to determine the largest number of HARQ processes as 3; if the configuration number corresponding to the uplink-downlink configuration information is 2, to determine the largest number of HARQ processes as 6; if the configuration number corresponding to the uplink-downlink configuration information is 3, to determine the largest number of HARQ processes as 7; if the configuration number corresponding to the uplink-downlink configuration information is 4, to determine the largest number of HARQ processes as 8; if the configuration number corresponding to the uplink-downlink configuration information is 5, to determine the largest number of HARQ processes as 12; and if the configuration number corresponding to the uplink-downlink configuration information is 6, to determine the largest number of HARQ processes as 5.

Figure 16C:
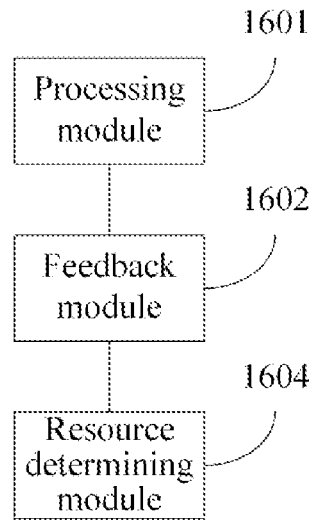
FIG. 16c is a third schematic structural diagram of an apparatus for making feedback for downlink data according to the sixteenth embodiment of the invention.

Furthermore as illustrated in FIG. 16c, the apparatus according to the sixteenth embodiment of the invention can further include:

a resource determining module 1604 is configured: if feedback is made in an uplink subframe n, for downlink data received in subframes n−k+10β in an uplink-downlink configuration with a configuration number L, to determine the same subframe as a subframe indicated in third feedback timing information among the subframes n−k+10β, where the subframe indicated in the third feedback timing information refers to a subframe, in which downlink data are transmitted, corresponding to feedback information transmitted in the uplink subframe n in the uplink-downlink configuration with the configuration number L according to feedback timing designed for a UE with a processing length of time being three subframes; for the determined same subframe, to share an implicit PUCCH resource for transmitting feedback information, with the UE with the processing duration being three subframes; and for any one of the other subframes among the subframes n−k+10β than the determined same subframe, to determine an implicit PUCCH resource, for transmitting feedback information, indicated in higher-layer signaling, or to determine an implicit PUCCH resource for transmitting feedback information under a predefined rule.

Particularly, the resource determining module 1604 can be configured: for any one of the other subframes among the subframes n−k+10β than the determined same subframe, to determine a start point of the implicit PUCCH resource indicated in the higher-layer signaling, and to determine the implicit PUCCH resource for transmitting feedback information, according to the start point, and the index of a first CCE for transmitting a PDCCH in the any one subframe, where the start point is different from a start point of an implicit PUCCH resource over which the UE with the processing duration being three subframes transmits feedback information.

Figure 16D:
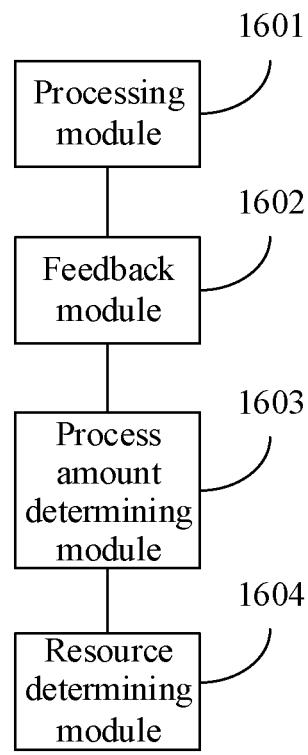
FIG. 16d is a schematic structural diagram in details of an apparatus for making feedback for downlink data according to the sixteenth embodiment of the invention.

FIG. 16d illustrates a schematic structural diagram in details of the apparatus for making feedback for downlink data according to the sixteenth embodiment of the invention.

Apparently, the apparatus for making feedback for downlink data according to the first embodiment of the invention can adapt feedback timing information for making feedback for downlink data when a processing duration of a UE is shortened.

Figure 17:
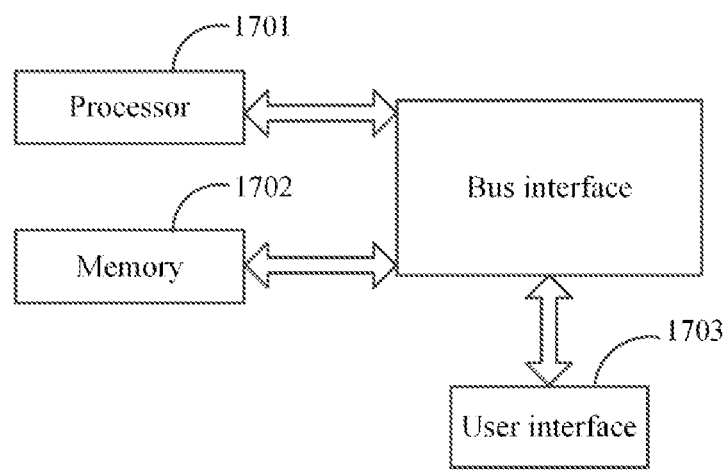
FIG. 17 is a schematic structural diagram of a User Equipment (UE) according to a seventeenth embodiment of the invention.

Seventeenth Embodiment the seventeenth embodiment of the invention provides a Use Equipment (UE) as illustrated in FIG. 17, where the UE includes:

a processor 1701 is configured to read and execute program in a memory 1702:

to determine a processing capability of the UE, where the processing capability refers to a processing duration that the UE takes to process received downlink data to decide whether to retransmit the downlink data; and to determine feedback timing information for the UE to make feedback for the downlink data, according to the determined processing capability.

Particularly, the processor 1701 can be configured: if the processing duration corresponding to the processing capability is three subframes, to determine first feedback timing information for the UE to make data for the downlink data, where the first feedback timing information is feedback timing information defined in the GPP LTE Rel-13 and earlier releases; and if the processing duration corresponding to the processing capability is less than three subframes, to determine second feedback timing information for the UE to make data for the downlink data, where the shortest duration for the UE to make feedback for the received downlink data according to feedback timing indicated in the second feedback timing information is less than the shortest duration for the UE to make feedback for the received downlink data according to feedback timing indicated in the first feedback timing information.

Particularly, the processor 1701 can be configured: if the processing duration corresponding to the processing capability is two subframes, to decide to make feedback for downlink data in a subframe n−k+10β, in an uplink subframe n, where when n<k, β is 1, and when n≥k, β is 0, where if a configuration number corresponding to uplink-downlink configuration information is 0, then when n is 3, 4, 8, or 9, k is 3; if the configuration number corresponding to the uplink-downlink configuration information is 1, then when n is 2 or 7, k is 3 and 6, and when n is 3 or 8, k is 3; if the configuration number corresponding to the uplink-downlink configuration information is 2, then when n is 2 or 7, k is 7, 4, 3, and 6; if the configuration number corresponding to the uplink-downlink configuration information is 3, then when n is 2, k is 7, 5, and 6, when n is 3, k is 5 and 4, and when n is 4, k is 4 and 3; if the configuration number corresponding to the uplink-downlink configuration information is 4, then when n is 2, k is 8, 7, 6, and 11, and when n is 3, k is 6, 5, 4, and 3; if the configuration number corresponding to the uplink-downlink configuration information is 5, then when n is 2, k is 12, 9, 8, 7, 5, 4, 3, 11, and 6; and if the configuration number corresponding to the uplink-downlink configuration information is 6, then when n is 2 or 7, k is 6, when n is 3 or 4, k is 4, and when n is 8, k is 3.

Particularly the processor 1701 can be configured: if the processing duration corresponding to the processing capability is one subframe, to decide to make feedback for downlink data in a subframe n−k+10β, in an uplink subframe n, where when n<k, β is 1, and when n≥k, β is 0, where if a configuration number corresponding to uplink-downlink configuration information is 0, then when n is 2, 3, 7, or 8, k is 2; if the configuration number corresponding to the uplink-downlink configuration information is 1, then when n is 2 or 7, k is 3 and 2, and when n is 3 or 8, k is 2; if the configuration number corresponding to the uplink-downlink configuration information is 2, then when n is 2 or 7, k is 4, 3, 2, and 6; if the configuration number corresponding to the uplink-downlink configuration information is 3, then when n is 2, k is 7, 5, and 6, when n is 3, k is 5 and 4, and when n is 4, k is 4 and 3; if the configuration number corresponding to the uplink-downlink configuration information is 4, then when n is 2, k is 8, 7, 5, and 6, and when n is 3, k is 5, 4, 3, and 2; if the configuration number corresponding to the uplink-downlink configuration information is 5, then when n is 2, k is 9, 8, 7, 5, 4, 3, 2, 11, and 6; and if the configuration number corresponding to the uplink-downlink configuration information is 6, then when n is 2, 3, or 4, k is 3, and when n is 7 or 8, k is 2.

Furthermore, the processor 1701 can be further configured: to determine the largest number of HARQ processes for the UE to make feedback for the downlink data, according to the determined processing capability, and uplink-downlink configuration information of the UE.

Particularly, the processor 1701 can be configured: when the processing duration corresponding to the processing capability is two subframes, if a configuration number corresponding to the uplink-downlink configuration information is 0, to determine the largest number of HARQ processes as 3; if the configuration number corresponding to the uplink-downlink configuration information is 1, to determine the largest number of HARQ processes as 5; if the configuration number corresponding to the uplink-downlink configuration information is 2, to determine the largest number of HARQ processes as 8; if the configuration number corresponding to the uplink-downlink configuration information is 3, to determine the largest number of HARQ processes as 7; if the configuration number corresponding to the uplink-downlink configuration information is 4, to determine the largest number of HARQ processes as 10; if the configuration number corresponding to the uplink-downlink configuration information is 5, to determine the largest number of HARQ processes as 13; and if the configuration number corresponding to the uplink-downlink configuration information is 6, to determine the largest number of HARQ processes as 5.

Particularly, the processor 1701 can be configured: when the processing duration corresponding to the processing capability is one subframe, if a configuration number corresponding to the uplink-downlink configuration information is 0, to determine the largest number of HARQ processes as 2; if the configuration number corresponding to the uplink-downlink configuration information is 1, to determine the largest number of HARQ processes as 3; if the configuration number corresponding to the uplink-downlink configuration information is 2, to determine the largest number of HARQ processes as 6; if the configuration number corresponding to the uplink-downlink configuration information is 3, to determine the largest number of HARQ processes as 7; if the configuration number corresponding to the uplink-downlink configuration information is 4, to determine the largest number of HARQ processes as 8; if the configuration number corresponding to the uplink-downlink configuration information is 5, to determine the largest number of HARQ processes as 12; and if the configuration number corresponding to the uplink-downlink configuration information is 6, to determine the largest number of HARQ processes as 5.

Furthermore, the processor 1701 can be further configured: if feedback is made in an uplink subframe n, for downlink data received in subframes n−k+10β in an uplink-downlink configuration with a configuration number L, to determine the same subframe as a subframe indicated in third feedback timing information among the subframes n−k+10β, where the subframe indicated in the third feedback timing information refers to a subframe, in which downlink data are transmitted, corresponding to feedback information transmitted in the uplink subframe n in the uplink-downlink configuration with the configuration number L according to feedback timing designed for a UE with a processing length of time being three subframes; for the determined same subframe, to share an implicit PUCCH resource for transmitting feedback information, with the UE with the processing duration being three subframes; and for any one of the other subframes among the subframes n−k+10β than the determined same subframe, to determine an implicit PUCCH resource, for transmitting feedback information, indicated in higher-layer signaling, or to determine an implicit PUCCH resource for transmitting feedback information under a predefined rule.

Particularly, the processor 1701 can be configured: for any one of the other subframes among the subframes n−k+10β than the determined same subframe, to determine a start point of the implicit PUCCH resource indicated in the higher-layer signaling, and to determine the implicit PUCCH resource for transmitting feedback information, according to the start point, and the index of a first CCE for transmitting a PDCCH in the any one subframe, where the start point is different from a start point of an implicit PUCCH resource over which the UE with the processing duration being three subframes transmits feedback information.

Here in FIG. 17, the bus architecture can include any number of interconnecting buses and bridges to particularly link together various circuits including one or more processors represented by the processor 1701, and one or more memories represented by the memory 1702. The bus architecture can further link together various other circuits, e.g., a peripheral device, a manostat, a power management circuit, etc., all of which are well known in the art, so a further description thereof will be omitted in this context. The bus interface serves as an interface. For different user equipment, the user interface 1703 can also be an interface via which devices are connected internally and externally as needed, and the connected devices include but will not be limited to a keypad, a monitor, a speaker, a microphone, a joystick, etc.

The processor 1701 is responsible for managing the bus architecture and performing normal processes, and the memory 1702 can store data for use by the processor 1701 in performing the operations.

Eighteenth Embodiment

Figure 18:
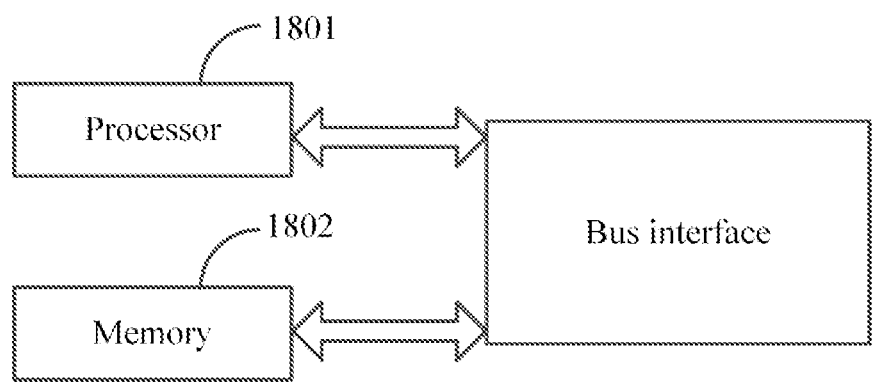
FIG. 18 is a schematic structural diagram of a network-side device according to an eighteenth embodiment of the invention.

The eighteenth embodiment of the invention further provides a network-side device as illustrated in FIG. 18, where the network-side device includes:

a processor 1801 is configured to read and execute program in a memory 1802:

to determine a processing capability of a UE, where the processing capability refers to a processing duration that the UE takes to process received downlink data to decide whether to retransmit the downlink data; and to determine feedback timing information for the UE to make feedback for the downlink data, according to the determined processing capability.

Particularly, the processor 1801 can be configured: if the processing duration corresponding to the processing capability is three subframes, to determine first feedback timing information for the UE to make data for the downlink data, where the first feedback timing information is feedback timing information defined in the GPP LTE Rel-13 and earlier releases; and if the processing duration corresponding to the processing capability is less than three subframes, to determine second feedback timing information for the UE to make data for the downlink data, where the shortest duration for the UE to make feedback for the received downlink data according to feedback timing indicated in the second feedback timing information is less than the shortest duration for the UE to make feedback for the received downlink data according to feedback timing indicated in the first feedback timing information.

Particularly, the processor 1801 can be configured: if the processing duration corresponding to the processing capability is two subframes, to decide to make feedback for downlink data in a subframe n−k+10β, in an uplink subframe n, where when n<k, β is 1, and when n≥k, β is 0, where if a configuration number corresponding to uplink-downlink configuration information is 0, then when n is 3, 4, 8, or 9, k is 3; if the configuration number corresponding to the uplink-downlink configuration information is 1, then when n is 2 or 7, k is 3 and 6, and when n is 3 or 8, k is 3; if the configuration number corresponding to the uplink-downlink configuration information is 2, then when n is 2 or 7, k is 7, 4, 3, and 6; if the configuration number corresponding to the uplink-downlink configuration information is 3, then when n is 2, k is 7, 5, and 6, when n is 3, k is 5 and 4, and when n is 4, k is 4 and 3; if the configuration number corresponding to the uplink-downlink configuration information is 4, then when n is 2, k is 8, 7, 6, and 11, and when n is 3, k is 6, 5, 4, and 3; if the configuration number corresponding to the uplink-downlink configuration information is 5, then when n is 2, k is 12, 9, 8, 7, 5, 4, 3, 11, and 6; and if the configuration number corresponding to the uplink-downlink configuration information is 6, then when n is 2 or 7, k is 6, when n is 3 or 4, k is 4, and when n is 8, k is 3.

Particularly, the processor 1801 can be configured: if the processing duration corresponding to the processing capability is one subframe, to decide to make feedback for downlink data in a subframe n−k+10β, in an uplink subframe n, where when n<k, β is 1, and when n≥k, β is 0, where if a configuration number corresponding to uplink-downlink configuration information is 0, then when n is 2, 3, 7, or 8, k is 2; if the configuration number corresponding to the uplink-downlink configuration information is 1, then when n is 2 or 7, k is 3 and 2, and when n is 3 or 8, k is 2; if the configuration number corresponding to the uplink-downlink configuration information is 2, then when n is 2 or 7, k is 4, 3, 2, and 6; if the configuration number corresponding to the uplink-downlink configuration information is 3, then when n is 2, k is 7, 5, and 6, when n is 3, k is 5 and 4, and when n is 4, k is 4 and 3; if the configuration number corresponding to the uplink-downlink configuration information is 4, then when n is 2, k is 8, 7, 5, and 6, and when n is 3, k is 5, 4, 3, and 2; if the configuration number corresponding to the uplink-downlink configuration information is 5, then when n is 2, k is 9, 8, 7, 5, 4, 3, 2, 11, and 6; and if the configuration number corresponding to the uplink-downlink configuration information is 6, then when n is 2, 3, or 4, k is 3, and when n is 7 or 8, k is 2.

Furthermore, the processor 1801 can be further configured: to determine the largest number of HARQ processes for the UE to make feedback for the downlink data, according to the determined processing capability, and uplink-downlink configuration information of the UE.

Particularly, the processor 1801 can be configured: when the processing duration corresponding to the processing capability is two subframes, if a configuration number corresponding to the uplink-downlink configuration information is 0, to determine the largest number of HARQ processes as 3; if the configuration number corresponding to the uplink-downlink configuration information is 1, to determine the largest number of HARQ processes as 5; if the configuration number corresponding to the uplink-downlink configuration information is 2, to determine the largest number of HARQ processes as 8; if the configuration number corresponding to the uplink-downlink configuration information is 3, to determine the largest number of HARQ processes as 7; if the configuration number corresponding to the uplink-downlink configuration information is 4, to determine the largest number of HARQ processes as 10; if the configuration number corresponding to the uplink-downlink configuration information is 5, to determine the largest number of HARQ processes as 13; and if the configuration number corresponding to the uplink-downlink configuration information is 6, to determine the largest number of HARQ processes as 5.

Particularly, the processor 1801 can be configured: when the processing duration corresponding to the processing capability is one subframe, if a configuration number corresponding to the uplink-downlink configuration information is 0, to determine the largest number of HARQ processes as 2; if the configuration number corresponding to the uplink-downlink configuration information is 1, to determine the largest number of HARQ processes as 3; if the configuration number corresponding to the uplink-downlink configuration information is 2, to determine the largest number of HARQ processes as 6; if the configuration number corresponding to the uplink-downlink configuration information is 3, to determine the largest number of HARQ processes as 7; if the configuration number corresponding to the uplink-downlink configuration information is 4, to determine the largest number of HARQ processes as 8; if the configuration number corresponding to the uplink-downlink configuration information is 5, to determine the largest number of HARQ processes as 12; and if the configuration number corresponding to the uplink-downlink configuration information is 6, to determine the largest number of HARQ processes as 5.

Furthermore, the processor 1801 can be further configured: if feedback is made in an uplink subframe n, for downlink data received in subframes n−k+10β in an uplink-downlink configuration with a configuration number L, to determine the same subframe as a subframe indicated in third feedback timing information among the subframes n−k+10β, where the subframe indicated in the third feedback timing information refers to a subframe, in which downlink data are transmitted, corresponding to feedback information transmitted in the uplink subframe n in the uplink-downlink configuration with the configuration number L according to feedback timing designed for a UE with a processing duration being three subframes; for the determined same subframe, to share an implicit PUCCH resource for transmitting feedback information, with the UE with the processing duration being three subframes; and for any one of the other subframes among the subframes n−k+10β than the determined same subframe, to determine an implicit PUCCH resource, for transmitting feedback information, indicated in higher-layer signaling, or to determine an implicit PUCCH resource for transmitting feedback information under a predefined rule.

Particularly, the processor 1801 can be configured: for any one of the other subframes among the subframes n−k+10β than the determined same subframe, to determine a start point of the implicit PUCCH resource indicated in the higher-layer signaling, and to determine the implicit PUCCH resource for transmitting feedback information, according to the start point, and the index of a first CCE for transmitting a PDCCH in the any one subframe, where the start point is different from a start point of an implicit PUCCH resource over which the UE with the processing duration being three subframes transmits feedback information.

Here in FIG. 18, the bus architecture can include any number of interconnecting buses and bridges to particularly link together various circuits including one or more processors represented by the processor 1801, and one or more memories represented by the memory 1802. The bus architecture can further link together various other circuits, e.g., a peripheral device, a manostat, a power management circuit, etc., all of which are well known in the art, so a further description thereof will be omitted in this context. The bus interface serves as an interface. The processor 1801 is responsible for managing the bus architecture and performing normal processes, and the memory 1802 can store data for use by the processor 1801 in performing the operations.

In summary, in the solutions according to the embodiments of the invention, the feedback timing information for the UE to make feedback for the downlink data can be determined respectively according to the different processing capability of the UE, i.e., the different processing duration for the UE to process the received downlink data to decide whether to retransmit the downlink data, and at this time, if the processing duration in the UE is shortened, then the feedback timing information for making feedback for the downlink data will be adapted, and feedback will be made for the downlink data, thus improving the user-plane delay performance.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for making feedback for downlink data, the method comprising:
   determining a processing capability of a User Equipment (UE), wherein the processing capability refers to a processing duration that the UE takes to process received downlink data to decide whether to retransmit the downlink data; and
   determining feedback timing information for the UE to make feedback for the downlink data, according to determined processing capability;
   wherein after the feedback timing information for the UE to make feedback for the downlink data is determined, the method further comprises:
   if feedback is made in an uplink subframe n, for downlink data received in subframes n−k+10β in an uplink-downlink configuration with a configuration number L:
   determining a subframe same as a subframe indicated in third feedback timing information among the subframes n−k+10β, wherein the subframe indicated in the third feedback timing information refers to a subframe, in which downlink data are transmitted, corresponding to feedback information transmitted in the uplink subframe n in the uplink-downlink configuration with the configuration number L according to feedback timing designed for a UE with a processing duration being three subframes;
   for determined same subframe, sharing an implicit PUCCH resource for transmitting feedback information, with the UE with the processing duration being three subframes; and
   for any one of other subframes among the subframes n−k+10β than the determined same subframe, determining an implicit PUCCH resource, for transmitting feedback information, indicated in higher-layer signaling, or determining an implicit PUCCH resource for transmitting feedback information under a predefined rule.

2. The method according to claim 1, wherein determining the feedback timing information for the UE to make feedback for the downlink data, according to the determined processing capability comprises:
   if the processing duration corresponding to the processing capability is three subframes, determining a first feedback timing information for the UE to make data for the downlink data, wherein the first feedback timing information is feedback timing information defined in the $3^{rd}$ Generation Partnership Project Long Term Evolution Release 13 (3GPP LTE Rel-13) and earlier releases; and
   if the processing duration corresponding to the processing capability is less than three subframes, determining a second feedback timing information for the UE to make data for the downlink data, wherein a shortest duration for the UE to make feedback for the received downlink data according to feedback timing indicated in the second feedback timing information is less than a shortest duration for the UE to make feedback for the received downlink data according to feedback timing indicated in the first feedback timing information.

3. The method according to claim 2, wherein if the processing duration corresponding to the processing capability is less than three subframes, determining the feedback timing information for the UE to make data for the downlink data as the second feedback timing information comprises:
if the processing duration corresponding to the processing capability is two subframes, deciding to make feedback for downlink data in a subframe n−k+10β, in an uplink subframe n, wherein when n<k, β is 1, and when n≥k, β is 0, wherein:
if a configuration number corresponding to uplink-downlink configuration information is 0, then when n is 3, 4, 8, or 9, k is 3;
if the configuration number corresponding to the uplink-downlink configuration information is 1, then when n is 2 or 7, k is 3 and 6, and when n is 3 or 8, k is 3;
if the configuration number corresponding to the uplink-downlink configuration information is 2, then when n is 2 or 7, k is 7, 4, 3, and 6;
if the configuration number corresponding to the uplink-downlink configuration information is 3, then when n is 2, k is 7, 5, and 6, when n is 3, k is 5 and 4, and when n is 4, k is 4 and 3;
if the configuration number corresponding to the uplink-downlink configuration information is 4, then when n is 2, k is 8, 7, 6, and 11, and when n is 3, k is 6, 5, 4, and 3;
if the configuration number corresponding to the uplink-downlink configuration information is 5, then when n is 2, k is 12, 9, 8, 7, 5, 4, 3, 11, and 6; and
if the configuration number corresponding to the uplink-downlink configuration information is 6, then when n is 2 or 7, k is 6, when n is 3 or 4, k is 4, and when n is 8, k is 3.

4. The method according to claim 2, wherein if the processing duration corresponding to the processing capability is less than three subframes, determining the feedback timing information for the UE to make data for the downlink data as the second feedback timing information comprises:
if the processing duration corresponding to the processing capability is one subframe, deciding to make feedback for downlink data in a subframe n−k+10β, in an uplink subframe n, wherein when n<k, β is 1, and when n≥k, β is 0, wherein:
if a configuration number corresponding to uplink-downlink configuration information is 0, then when n is 2, 3, 7, or 8, k is 2;
if the configuration number corresponding to the uplink-downlink configuration information is 1, then when n is 2 or 7, k is 3 and 2, and when n is 3 or 8, k is 2;
if the configuration number corresponding to the uplink-downlink configuration information is 2, then when n is 2 or 7, k is 4, 3, 2, and 6;
if the configuration number corresponding to the uplink-downlink configuration information is 3, then when n is 2, k is 7, 5, and 6, when n is 3, k is 5 and 4, and when n is 4, k is 4 and 3;
if the configuration number corresponding to the uplink-downlink configuration information is 4, then when n is 2, k is 8, 7, 5, and 6, and when n is 3, k is 5, 4, 3, and 2;
if the configuration number corresponding to the uplink-downlink configuration information is 5, then when n is 2, k is 9, 8, 7, 5, 4, 3, 2, 11, and 6; and if the configuration number corresponding to the uplink-downlink configuration information is 6, then when n is 2, 3, or 4, k is 3, and when n is 7 or 8, k is 2.

5. The method according to claim 1, further comprises:
determining a largest number of Hybrid Automatic Repeat Request (HARQ) processes for the UE to make feedback for the downlink data, according to the determined processing capability, and uplink-downlink configuration information of the UE.

6. The method according to claim 5, wherein determining the largest number of HARQ processes for the UE to make feedback for the downlink data, according to the determined processing capability, and the uplink-downlink configuration information of the UE comprises:
when the processing duration corresponding to the processing capability is two subframes, if a configuration number corresponding to the uplink-downlink configuration information is 0, determining the largest number of HARQ processes as 3; if the configuration number corresponding to the uplink-downlink configuration information is 1, determining the largest number of HARQ processes as 5; if the configuration number corresponding to the uplink-downlink configuration information is 2, determining the largest number of HARQ processes as 8; if the configuration number corresponding to the uplink-downlink configuration information is 3, determining the largest number of HARQ processes as 7; if the configuration number corresponding to the uplink-downlink configuration information is 4, determining the largest number of HARQ processes as 10; if the configuration number corresponding to the uplink-downlink configuration information is 5, determining the largest number of HARQ processes as 13; and if the configuration number corresponding to the uplink-downlink configuration information is 6, determining the largest number of HARQ processes as 5.

7. The method according to claim 5, wherein determining the largest number of HARQ processes for the UE to make feedback for the downlink data, according to the determined processing capability, and the uplink-downlink configuration information of the UE comprises:
when the processing duration corresponding to the processing capability is one subframe, if a configuration number corresponding to the uplink-downlink configuration information is 0, determining the largest number of HARQ processes as 2; if the configuration number corresponding to the uplink-downlink configuration information is 1, determining the largest number of HARQ processes as 3; if the configuration number corresponding to the uplink-downlink configuration information is 2, determining the largest number of HARQ processes as 6; if the configuration number corresponding to the uplink-downlink configuration information is 3, determining the largest number of HARQ processes as 7; if the configuration number corresponding to the uplink-downlink configuration information is 4, determining the largest number of HARQ processes as 8; if the configuration number corresponding to the uplink-downlink configuration information is 5, determining the largest number of HARQ processes as 12; and if the configuration number corresponding to the uplink-downlink configuration information is 6, determining the largest number of HARQ processes as 5.

8. The method according to claim 1, wherein for any one of the other subframes among the subframes n−k+10β than the determined same subframe, determining the implicit PUCCH resource for transmitting feedback information under the predefined rule comprises:

for any one of the other subframes among the subframes n−k+10β than the determined same subframe, determining a start point of the implicit PUCCH resource indicated in the higher-layer signaling, and determining the implicit PUCCH resource for transmitting feedback information, according to the start point, and the index of a first Control Channel Element (CCE) for transmitting a Physical Downlink Control Channel (PDCCH) in the any one subframe, wherein the start point is different from a start point of an implicit PUCCH resource over which the UE with the processing duration being three subframes transmits feedback information.

9. An apparatus for making feedback for downlink data, the apparatus comprising:

a processor configured to read and execute a program in a memory:

to determine a processing capability of the UE, wherein the processing capability refers to a processing duration that the UE takes to process received downlink data to decide whether to retransmit the downlink data; and to determine feedback timing information for the UE to make feedback for the downlink data, according to the determined processing capability;

wherein the processor is further configured to read and execute the program in the memory:

if feedback is made in an uplink subframe n, for downlink data received in subframes n−k+10β in an uplink-downlink configuration with a configuration number L:

to determine the same subframe as a subframe indicated in third feedback timing information among the subframes n−k+10β, wherein the subframe indicated in the third feedback timing information refers to a subframe, in which downlink data are transmitted, corresponding to feedback information transmitted in the uplink subframe n in the uplink-downlink configuration with the configuration number L according to feedback timing designed for a UE with a processing length of time being three subframes;

for the determined same subframe, to share an implicit PUCCH resource for transmitting feedback information, with the UE with the processing duration being three subframes; and for any one of the other subframes among the subframes n−k+10β than the determined same subframe, to determine an implicit PUCCH resource, for transmitting feedback information, indicated in higher-layer signaling, or to determine an implicit PUCCH resource for transmitting feedback information under a predefined rule.

10. The apparatus according to claim 9, wherein the processor is configured to read and execute the program in the memory:

if the processing duration corresponding to the processing capability is three subframes, to determine first feedback timing information for the UE to make data for the downlink data, wherein the first feedback timing information is feedback timing information defined in the 3$^{rd}$ Generation Partnership Project Long Term Evolution Release 13 (3GPP LTE Rel-13) and earlier releases; and if the processing duration corresponding to the processing capability is less than three subframes, to determine second feedback timing information for the UE to make data for the downlink data, wherein the shortest duration for the UE to make feedback for the received downlink data according to feedback timing indicated in the second feedback timing information is less than the shortest duration for the UE to make feedback for the received downlink data according to feedback timing indicated in the first feedback timing information.

11. The apparatus according to claim 10, wherein the processor is configured to read and execute the program in the memory:

if the processing duration corresponding to the processing capability is two subframes, to decide to make feedback for downlink data in a subframe n−k+10β, in an uplink subframe n, wherein when n<k, β is 1, and when n≥k, β is 0, wherein:

if a configuration number corresponding to uplink-downlink configuration information is 0, then when n is 3, 4, 8, or 9, k is 3;

if the configuration number corresponding to the uplink-downlink configuration information is 1, then when n is 2 or 7, k is 3 and 6, and when n is 3 or 8, k is 3;

if the configuration number corresponding to the uplink-downlink configuration information is 2, then when n is 2 or 7, k is 7, 4, 3, and 6;

if the configuration number corresponding to the uplink-downlink configuration information is 3, then when n is 2, k is 7, 5, and 6, when n is 3, k is 5 and 4, and when n is 4, k is 4 and 3;

if the configuration number corresponding to the uplink-downlink configuration information is 4, then when n is 2, k is 8, 7, 6, and 11, and when n is 3, k is 6, 5, 4, and 3;

if the configuration number corresponding to the uplink-downlink configuration information is 5, then when n is 2, k is 12, 9, 8, 7, 5, 4, 3, 11, and 6; and if the configuration number corresponding to the uplink-downlink configuration information is 6, then when n is 2 or 7, k is 6, when n is 3 or 4, k is 4, and when n is 8, k is 3.

12. The apparatus according to claim 10, wherein the processor is configured to read and execute the program in the memory:

if the processing duration corresponding to the processing capability is one subframe, to decide to make feedback for downlink data in a subframe n−k+10β, in an uplink subframe n, wherein when n<k, β is 1, and when n≥k, β is 0, wherein:

if a configuration number corresponding to uplink-downlink configuration information is 0, then when n is 2, 3, 7, or 8, k is 2;

if the configuration number corresponding to the uplink-downlink configuration information is 1, then when n is 2 or 7, k is 3 and 2, and when n is 3 or 8, k is 2;

if the configuration number corresponding to the uplink-downlink configuration information is 2, then when n is 2 or 7, k is 4, 3, 2, and 6;

if the configuration number corresponding to the uplink-downlink configuration information is 3, then when n is 2, k is 7, 5, and 6, when n is 3, k is 5 and 4, and when n is 4, k is 4 and 3;

if the configuration number corresponding to the uplink-downlink configuration information is 4, then when n is 2, k is 8, 7, 5, and 6, and when n is 3, k is 5, 4, 3, and 2;

if the configuration number corresponding to the uplink-downlink configuration information is 5, then when n is 2, k is 9, 8, 7, 5, 4, 3, 2, 11, and 6; and if the configuration number corresponding to the uplink-downlink configuration information is 6, then when n is 2, 3, or 4, k is 3, and when n is 7 or 8, k is 2.

13. The apparatus according to claim 9, wherein the processor is configured to read and execute the program in the memory:
to determine the largest number of Hybrid Automatic Repeat Request (HARQ) processes for the UE to make feedback for the downlink data, according to the determined processing capability, and uplink-downlink configuration information of the UE.

14. The apparatus according to claim 13, wherein the processor is configured to read and execute the program in the memory:
when the processing duration corresponding to the processing capability is two subframes, if a configuration number corresponding to the uplink-downlink configuration information is 0, to determine the largest number of HARQ processes as 3; if the configuration number corresponding to the uplink-downlink configuration information is 1, to determine the largest number of HARQ processes as 5; if the configuration number corresponding to the uplink-downlink configuration information is 2, to determine the largest number of HARQ processes as 8; if the configuration number corresponding to the uplink-downlink configuration information is 3, to determine the largest number of HARQ processes as 7; if the configuration number corresponding to the uplink-downlink configuration information is 4, to determine the largest number of HARQ processes as 10; if the configuration number corresponding to the uplink-downlink configuration information is 5, to determine the largest number of HARQ processes as 13; and if the configuration number corresponding to the uplink-downlink configuration information is 6, to determine the largest number of HARQ processes as 5.

15. The apparatus according to claim 13, wherein the processor is configured to read and execute the program in the memory:
when the processing duration corresponding to the processing capability is one subframe, if a configuration number corresponding to the uplink-downlink configuration information is 0, to determine the largest number of HARQ processes as 2; if the configuration number corresponding to the uplink-downlink configuration information is 1, to determine the largest number of HARQ processes as 3; if the configuration number corresponding to the uplink-downlink configuration information is 2, to determine the largest number of HARQ processes as 6; if the configuration number corresponding to the uplink-downlink configuration information is 3, to determine the largest number of HARQ processes as 7; if the configuration number corresponding to the uplink-downlink configuration information is 4, to determine the largest number of HARQ processes as 8; if the configuration number corresponding to the uplink-downlink configuration information is 5, to determine the largest number of HARQ processes as 12; and if the configuration number corresponding to the uplink-downlink configuration information is 6, to determine the largest number of HARQ processes as 5.

16. The apparatus according to claim 9, wherein the processor is configured to read and execute the program in the memory:
for any one of the other subframes among the subframes $n-k+10\beta$ than the determined same subframe, to determine a start point of the implicit PUCCH resource indicated in the higher-layer signaling, and to determine the implicit PUCCH resource for transmitting feedback information, according to the start point, and the index of a first CCE for transmitting a PDCCH in the any one subframe, wherein the start point is different from a start point of an implicit PUCCH resource over which the UE with the processing duration being three subframes transmits feedback information.

* * * * *